(12) United States Patent
Rezvani et al.

(10) Patent No.: US 11,261,112 B2
(45) Date of Patent: Mar. 1, 2022

(54) NITRATE REMOVAL FROM DRINKING WATER

(71) Applicants: Fariba Rezvani, Tehran (IR); Mohammad Hossein Sarrafzadeh, Tehran (IR)

(72) Inventors: Fariba Rezvani, Tehran (IR); Mohammad Hossein Sarrafzadeh, Tehran (IR)

(*) Notice: Subject to any disclaimer, the term of this patent is extended or adjusted under 35 U.S.C. 154(b) by 0 days.

(21) Appl. No.: 16/994,674

(22) Filed: Aug. 17, 2020

(65) Prior Publication Data
US 2020/0377399 A1 Dec. 3, 2020

Related U.S. Application Data

(60) Provisional application No. 62/888,448, filed on Aug. 17, 2019.

(51) Int. Cl.
| | |
|---|---|
| *C02F 3/34* | (2006.01) |
| *C02F 3/30* | (2006.01) |
| *C02F 3/32* | (2006.01) |
| *C02F 101/16* | (2006.01) |
| *C02F 101/10* | (2006.01) |

(52) U.S. Cl.
CPC .............. *C02F 3/348* (2013.01); *C02F 3/305* (2013.01); *C02F 3/325* (2013.01); *C02F 2101/105* (2013.01); *C02F 2101/163* (2013.01); *C02F 2203/004* (2013.01)

(58) Field of Classification Search
CPC .......... C02F 3/348; C02F 3/305; C02F 3/325; C02F 2203/004; C02F 2101/163; C02F 2101/105; C02F 2209/44; C02F 2209/15; C02F 1/66; C02F 3/2846; C02F 3/282; C02F 2209/06; C02F 2209/40; C02F 2209/18
USPC .......................... 210/602, 612, 613, 631, 903
See application file for complete search history.

(56) References Cited

U.S. PATENT DOCUMENTS

| | | | | |
|---|---|---|---|---|
| 4,756,831 | A * | 7/1988 | Menzel | ................... C02F 3/006 210/617 |
| 4,935,130 | A * | 6/1990 | Sieksmeyer | ............ C02F 3/302 210/151 |
| 5,062,957 | A * | 11/1991 | Berreby | .................... C02F 3/34 210/611 |
| 2007/0045183 | A1 * | 3/2007 | Murphy | ................ C02F 3/1273 210/631 |

(Continued)

*Primary Examiner* — Fred Prince
(74) *Attorney, Agent, or Firm* — Bajwa IP Law Firm; Haris Zaheer Bajwa

(57) ABSTRACT

A method for nitrate removal from drinking water. The method includes adapting a sludge including hydrogenotrophic denitrifiers (HTDs) by dominating the HTDs in the sludge, cultivating a microalgae biomass, forming a microalgae-HTD biomass by cultivating a mixture of the adapted sludge and the cultivated microalgae biomass, nucleating a plurality of microalgae-HTD granules by cultivating the formed microalgae-HTD biomass in a sequencing batch (SB) mode with a constant HRT, growing the plurality of microalgae-HTD granules by cultivating the nucleated plurality of microalgae-HTD granules in an up flow (UF) mode with a reducing HRT, and continuous nitrate removal from nitrate-contaminated water with a minimum HRT over the grown plurality of microalgae-HTD granules.

20 Claims, 17 Drawing Sheets

(56) References Cited

U.S. PATENT DOCUMENTS

2015/0284280 A1* 10/2015 Huang .................... C02F 3/305
                                                                                 210/631
2015/0353397 A1* 12/2015 Cath ..................... C02F 3/1263
                                                                                 210/195.1

* cited by examiner

NITRATE REMOVAL FROM DRINKING WATER

CROSS-REFERENCE TO RELATED APPLICATION

This application claims the benefit of priority from U.S. Provisional Patent Application Ser. No. 62/888,448 filed on Aug. 17, 2019, and entitled "NITRATE REMOVAL FROM DRINKING WATER", which is incorporated herein by reference in its entirety.

TECHNICAL FIELD

The present disclosure generally relates to nitrate removal from water, and particularly, to a method and a system for fast biological nitrate removal from drinking water utilizing granules of a mixture of green microalgae and hydrogenotrophic denitrifiers in a continuous hybrid photobioreactor.

BACKGROUND

Nitrate is one of the major water pollutants in many areas of the world. Nitrate pollution of drinking water resources, especially groundwater has become a critical global issue, which may primarily be a result of agricultural activity majorly because of excess application of inorganic nitrogenous fertilizers and manures, wastewater treatment, and oxidation of nitrogenous waste products in human and animal excreta including septic tanks.

Biological nitrate removal, which is driven by either heterotrophic or autotrophic microorganisms, can remove nitrate completely and be conducted both in situ and ex situ without producing any brine as a byproduct. Nitrate removal by microorganisms can be conducted primarily by assimilation of nitrate into biomass and dissimilation of nitrate into nitrogen gas; however, dissimilation is faster than assimilation and produces lower waste disposal. Biological denitrification as one of the main approaches of biological nitrate removal within the dissimilatory pathway, has been shown to be economically and environmentally sound, owing to its selective removal capability for the complete elimination of nitrate and formation of harmless end products. However, most of the biological nitrate removal processes that have been conducted in fluidized-bed reactors and packed-bed reactors at pilot scale, have been faced with numerous challenges including high-costs for constructing bioreactors and removing outlet biomass and suspended solids to make a clear treated water. Moreover, they need a high hydraulic retention time (HRT), more than several weeks, to form biofilm and remove nitrate completely.

Heterotrophic microorganisms require an organic carbon source as an electron donor to rapidly grow and take up nitrate as electron acceptor as well as biomass production; however, this process causes secondary pollution resulted from remaining carbon source. Moreover, the residual organic carbons react with chlorine (Cl) gas during disinfection process, which causes production of some carcinogenic halomethanes. In contrast, autotrophic nitrate removal has sparked the interest of many researchers because this process is cost-effective, non-polluting, and generative of a low amount of biomass over heterotrophs. Autotrophic microorganisms use inorganic carbon like $CO_2$ and inorganic matters such as $H_2$, reduced sulfur, and $Fe^{2+}$ as their energy sources. Hydrogen as the best electron donor for autotrophic denitrifiers has recently attracted a lot of attention rather than sulfur compounds, since, in contrast to sulfur, hydrogen dose not reduce pH in the environment and does not produce any byproducts. Among the autotrophic methods, hydrogenotrophic denitrification processes have attracted substantial attention due to producing clean products without any waste and biomass. However, the low-solubility and high flammability of hydrogen at the presence of oxygen may be considered as the most drawbacks of this process.

Hence, there is a need for a nitrate removal process from water which may overcome drawbacks of biological nitrate removal processes which utilize heterotrophic or autotrophic microorganisms. There is a need for a safe and non-pollutant method for nitrate removal process from water with a considerably reduced and short HRT. More clearly, there is a need for a nitrate removal process from water, which may not involve an organic carbon resource consumption, and/or consuming external hydrogen gas as a hydrogen resource.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for nitrate removal from drinking water. The method may include adapting a sludge including hydrogenotrophic denitrifiers (HTDs) by dominating the HTDs among a plurality of microorganisms present in the sludge, cultivating a microalgae biomass, forming a microalgae-HTD biomass by cultivating a mixture of the adapted sludge and the cultivated microalgae biomass in nitrate-contaminated water inside a photobioreactor in a batch mode at a set of controlled operational conditions, nucleating a plurality of microalgae-HTD granules by cultivating the microalgae-HTD biomass in the nitrate-contaminated water inside the photobioreactor in a sequencing batch (SB) mode with a constant hydraulic retention time (HRT), and growing the plurality of microalgae-HTD granules by cultivating the nucleated plurality of microalgae-HTD granules in the nitrate-contaminated water inside the photobioreactor in an up flow (UF) mode with a reducing HRT at the set of controlled operational conditions. In an exemplary implementation, forming the microalgae-HTD biomass, nucleating the plurality of microalgae-HTD granules, and growing the plurality of microalgae-HTD granules may include reducing nitrate-nitrogen ($NO_3^-$—N) concentration of the nitrate-contaminated water to less than 5 mg/L.

In an exemplary implementation, the sludge may include an activated sludge that may be collected from anaerobic section of a sewage treatment plant.

In an exemplary implementation, the sludge may include an activated sludge that may be collected from anaerobic section of a sewage treatment plant In an exemplary implementation, the nitrate-contaminated water may include a nitrate ($NO_3^-$) concentration in a range between 100 mg/L and 350 mg/L. In an exemplary implementation, the nitrate-contaminated water may include at least one of nitrate-contaminated drinking water, pristine mountain water, tap water, ground water, synthetic nitrate-contaminated water, and combinations thereof. In an exemplary implementation, the nitrate-contaminated water may include tap water including at least one salt of $KNO_3$, NaNO$_3$, and combinations thereof with a NO$_3^-$—N concentration between 20 mg/L and 80 mg/L, and at least one salt of KH$_2$PO$_4$, NaH$_2$PO$_4$, and combinations thereof with a PO$_4^{3-}$—P concentration between 3 mg/L and 13 mg/L.

In an exemplary implementation, adapting the sludge may include feeding the HTDs in the sludge with a mixture of carbon dioxide (CO$_2$), hydrogen gas (H$_2$), and the nitrate-contaminated water. In an exemplary implementation, adapting the sludge may further include reducing nitrate-nitrogen (NO$_3^-$—N) concentration of the nitrate-contaminated water to less than 5 mg/L.

In an exemplary implementation, adapting the sludge may include rinsing the sludge by water, placing the rinsed sludge in a container, forming the adapted sludge, settling down the adapted sludge in the container, and discharging a supernatant above the settled down adapted sludge. In an exemplary implementation, forming the adapted sludge may include injecting CO$_2$ gas into the container with a flow rate in a range between 5 mL/min and 25 mL/min, injecting H$_2$ gas into the container with a flow rate in a range between 10 mL/min and 30 mL/min, and injecting the nitrate-contaminated water into the container. In an exemplary implementation, forming the adapted sludge, settling down the adapted sludge, and discharging the supernatant may be done iteratively in 2-day cycles.

In an exemplary implementation, forming the adapted sludge may further include stirring the rinsed sludge, the injected CO$_2$ gas, the injected H$_2$ gas, and the injected nitrate-contaminated water in the container by rotating a mechanical stirrer in the container at a rotating speed in a range between 15 rpm and 40 rpm.

In an exemplary implementation, cultivating the microalgae biomass may include cultivating a microalgae strain that may include at least one of an *Ettlia* sp. strain, a *C. vulgaris* strain, a *C. reinhardtii* strain, and combinations thereof.

In an exemplary implementation, cultivating the microalgae biomass may include placing the microalgae strain and a BG11 medium (Blue-Green Medium) in a vessel, forming a cultured microalgae biomass, and settling down the cultured microalgae biomass. In an exemplary implementation, forming the cultured microalgae biomass may include incubating the microalgae strain and the BG11 medium within the vessel at a temperature in a range between 23° C. and 33° C., mixing the microalgae and the BG11 medium within the vessel at a mixing speed between 120 rpm and 220 rpm, and lighting the microalgae and the BG11 medium within the vessel with a light intensity in a range between 200 µmol/m$^2$/s and 400 µmol/m$^2$/s. In an exemplary implementation, incubating the microalgae strain and the BG11 medium, mixing the microalgae and the BG11 medium, and lighting the microalgae and the BG11 medium may be carried out concurrently for a time interval in a range between 4 days and 14 days.

In an exemplary implementation, cultivating the microalgae biomass may include cultivating a mixture of two or more microalgae strains with equal cell numbers of the two or more microalgae strains. In such implementations, cultivating the microalgae biomass may further include transferring a mixture of two or more pre-cultivated microalgae biomass to a container containing BG11 medium, forming a mix-cultured microalgae biomass, and settling down the mix-cultured microalgae biomass. In an exemplary embodiment, the mixture of the two or more pre-cultivated microalgae biomass may include an equal amount of each of the settled down cultured microalgae biomass associated with each of the two or more microalgae strains. In an exemplary implementation, forming the mix-cultured microalgae biomass may include incubating the mixture of the pre-cultivated microalgae and the BG11 medium in the container at a temperature in a range between 23° C. and 33° C., mixing the mixture of the pre-cultivated microalgae and the BG11 medium in the container at a mixing speed between 120 rpm and 220 rpm, and lighting the mixture of the pre-cultivated microalgae and the BG11 medium in the container with a light intensity in a range between 200 µmol/m$^2$/s and 400 µmol/m$^2$/s. In an exemplary implementation, incubating the mixture of the pre-cultivated microalgae and the BG11 medium, mixing the mixture of the pre-cultivated microalgae and the BG11 medium, and lighting the mixture of the pre-cultivated microalgae and the BG11 medium may be carried out concurrently for a time interval in a range between 4 days and 14 days.

In an exemplary implementation, the set of controlled operational conditions may include keeping temperature of contents within the photobioreactor at a range between 23° C. and 33° C. by circulating a liquid through an outer layer around the photobioreactor, keeping pH value of the contents within the photobioreactor in a range between 6.5 and 7.5 by controlling injection of CO$_2$ to the photobioreactor, and applying a light-dark cycle to the contents within the photobioreactor. In an exemplary implementation, applying the light-dark cycle to the contents within the photobioreactor may include lighting the contents within the photobioreactor for a time period between 13 hours and 19 hours with a light intensity in a range between 200 µmol/m$^2$/s and 400 µmol/m$^2$/s using a set of light-emitting diodes (LEDs) located around the photobioreactor, and turning off the set of LEDs for a time period between 5 hours and 11 hours. Where, lighting the contents within the photobioreactor, and turning off the set of LEDs may be carried out sequentially.

In an exemplary implementation, forming the microalgae-HTD biomass may include preparing a microalgae-HTD biomass producing medium, forming the microalgae-HTD biomass by mixing the microalgae-HTD biomass producing medium comprising circulating a part of the microalgae-HTD biomass producing medium using a first peristaltic pump, measuring an amount of nitrogen-nitrate (NO$_3^-$—N) of the microalgae-HTD biomass producing medium, settling down the microalgae-HTD biomass responsive to the measured amount of nitrogen-nitrate (NO$_3^-$—N) being less than 5 mg/L, and discharging a supernatant above the settled down microalgae-HTD biomass from the photobioreactor. In an exemplary implementation, preparing the microalgae-HTD biomass producing medium may include feeding the nitrate-contaminated water to the photobioreactor with an amount equal to a working volume of the photobioreactor, adding the mixture of the adapted sludge and the cultivated microalgae biomass with a mass ratio between 0.5 and 1.5 to the fed nitrate-contaminated water to the photobioreactor, and injecting CO$_2$ to the photobioreactor with a flow rate between 70 mL/min and 200 mL/min.

In an exemplary implementation, nucleating the plurality of microalgae-HTD granules may include applying a feeding phase, applying a reaction phase at the set of controlled operational conditions, and applying a screening phase. In an exemplary implementation, applying the feeding phase, applying the reaction phase, and applying the screening phase may be carried out sequentially in a cycle with the constant HRT between 1 days and 6 days.

In an exemplary implementation, applying the feeding phase may include feeding the nitrate-contaminated water into the photobioreactor using a second peristaltic pump. In an exemplary implementation, applying the reaction phase at the set of controlled operational conditions may include turning the second peristaltic pump off, keeping pH value of the contents within the photobioreactor in a range between 6.5 and 7.5 by injecting $CO_2$ to the photobioreactor with a flow rate between 70 mL/min and 200 mL/min, mixing the fed nitrate-contaminated water and the formed microalgae-HTD biomass by circulating a part of contents within the photobioreactor using the first peristaltic pump, keeping temperature of contents within the photobioreactor at a range between 23° C. and 33° C. by circulating a liquid through an outer layer around the photobioreactor, and applying the light-dark cycle to the contents within the photobioreactor. In an exemplary implementation, applying the screening phase may include settling down the mixed nitrate-contaminated water and microalgae-HTD biomass for a time duration between 10 minutes and 1 hour, and discharging a supernatant above the settled down mixed nitrate-contaminated water and microalgae-HTD biomass. In an exemplary embodiment, the discharged supernatant may be equal to half of volume of contents within the photobioreactor.

In an exemplary implementation, growing the plurality of microalgae-HTD granules may include continuously feeding the nitrate-contaminated water into the photobioreactor with a reducing HRT from the constant HRT to a minimum HRT using the second peristaltic pump, continuously injecting $CO_2$ to the photobioreactor with a flow rate between 70 mL/min and 200 mL/min, mixing the fed nitrate-contaminated water and the plurality of microalgae-HTD granules by circulating a part of contents within the photobioreactor using the first peristaltic pump, and driving out a plurality of low-settleable microalgae-HTD granules by continuously discharging an overflow of the photobioreactor. In an exemplary embodiment, the overflow may include the plurality of low-settleable microalgae-HTD granules.

In an exemplary implementation, driving out the plurality of low-settleable microalgae-HTD granules may further include remaining high-settleable microalgae-HTD granules within the photobioreactor. In an exemplary embodiment, the plurality of high-settleable microalgae-HTD granules may include a plurality of microalgae-HTD granules with a zeta potential in a range between 1.3 and 4.5 times of a zeta potential of the low-settleable microalgae-HTD granules or more.

In an exemplary implementation, continuously feeding the nitrate-contaminated water into the photobioreactor with the reducing HRT may include continuously feeding the nitrate-contaminated water into the photobioreactor with the reducing HRT from the constant HRT in a range between 1 day and 6 days to the minimum HRT in a range between 1 hour and 1 day.

In an exemplary implementation, the exemplary method for nitrate removal from drinking water may further include continuous nitrate removal from a continuous flow of the nitrate-contaminated water with the minimum HRT over the grown plurality of microalgae-HTD granules inside the photobioreactor in the UF mode at the set of controlled operational conditions. In an exemplary implementation, continuous nitrate removal from the continuous flow of the nitrate-contaminated water with the minimum HRT over the grown plurality of microalgae-HTD granules may include continuously feeding the nitrate-contaminated water into the photobioreactor with the minimum HRT using the second peristaltic pump, continuously injecting $CO_2$ to the photobioreactor with a flow rate between 70 mL/min and 200 mL/min, mixing the fed nitrate-contaminated water and the grown plurality of microalgae-HTD granules by circulating a part of contents within the photobioreactor using the first peristaltic pump, and continuously discharging purified water from the photobioreactor.

BRIEF DESCRIPTION OF THE DRAWINGS

The drawing figures depict one or more implementations in accord with the present teachings, by way of example only, not by way of limitation. In the figures, like reference numerals refer to the same or similar elements.

at 400× magnification (first week of continuous process), consistent with one or more exemplary embodiments of the present disclosure.

Figure 8:
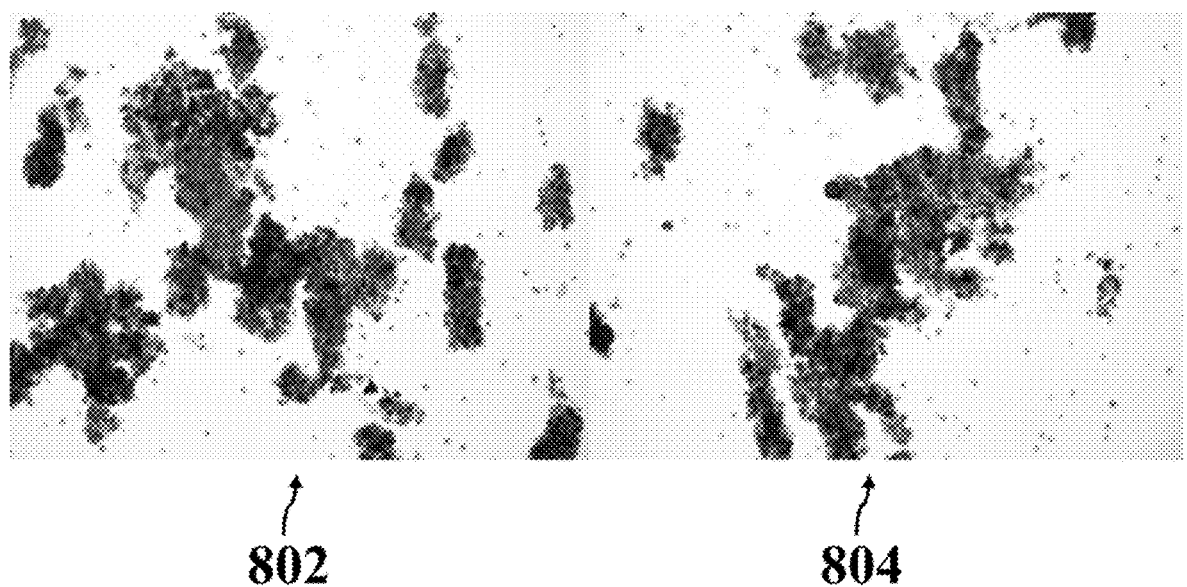

FIG. 8 illustrates two microscopic images of fine-granular cores of HTD (integrated dark area in the centers) and microalgae (bright spots with spherical shapes around the core) at 100× magnification (three weeks of continuous process), consistent with one or more exemplary embodiments of the present disclosure.

Figure 9A:
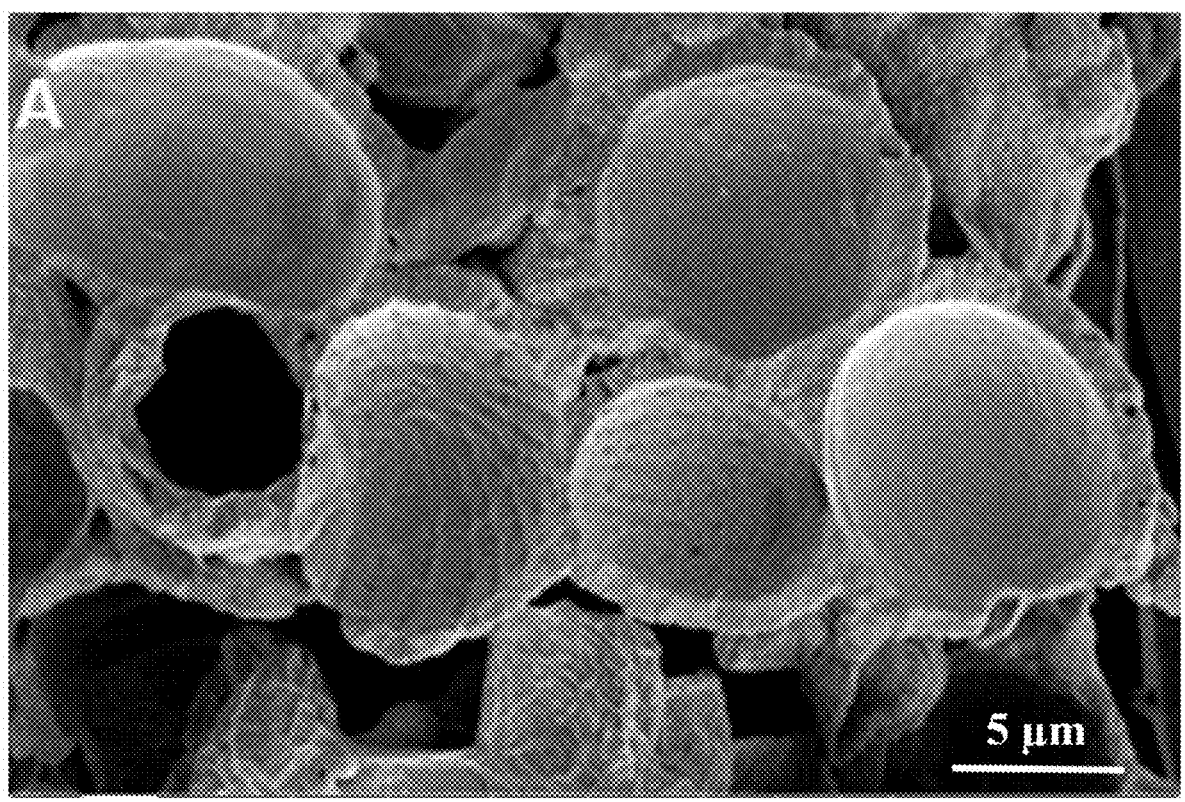

FIG. 9A illustrates a scanning electron microscope (SEM) image of the connection of HTDs and microalgae by an exemplary produced gel-layer after about two weeks, consistent with one or more exemplary embodiments of the present disclosure.

Figure 9B:
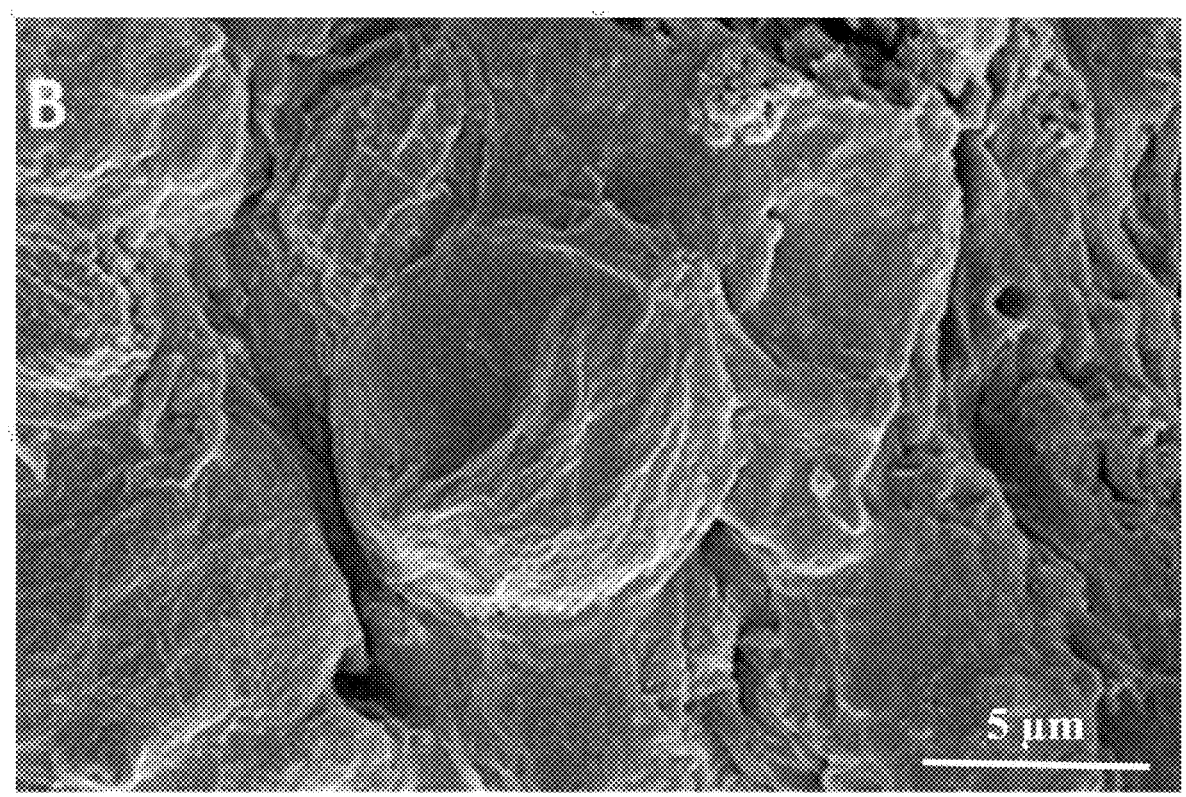

FIG. 9B illustrates a SEM image representing the exemplary gel-layer covered completely on a surface of microalgae at the end of process, consistent with one or more exemplary embodiments of the present disclosure.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Microalgae have potential to consume a lot of nitrate during $CO_2$ capturing and cell growth at irradiance, so they may be utilized in biological nitrate removal technologies. Furthermore, utilizing microalgae in biological nitrate removal can increase the added-value of produced biomass which may be applied in biofuel industries. Photoautotrophs, such as microalgae and cyanobacteria, may use light as an energy source to fix $CO_2$ and assimilate nitrate as their biomass. Some green microalgae, such as *Chlamydomonas reinhardtii*, can produce hydrogen along with nitrate assimilation at the presence of light. Therefore, such microalgae may be combined with hydrogen consumer denitrifying bacteria that may lead to a synergetic collaboration, allowing for complete nitrate removal in a safe process.

The most research on application of microalgae and bacteria has been related to waste water treatment under heterotrophic condition, not water treatment under autotrophic condition. One of the most important problems of application of microalgae for treating contaminated water may be related to separating their biomass form treated water. Microalgae have a very small size, low cell density, and negative charge, which may cause them to float on the surface and make it challenging to conduct a post-treatment process. Some current methods including centrifuge, coagulation, and gravity have been utilized to separate microalgae from their medium; however, these methods lead to some challenges including being high-cost, time-consuming, and re-separation of released components in the medium. Low settleability of microalgae may be solved by utilizing a microalgae-bacteria consortium that may be possible via granulation. Activated sludge (AS), which contains a lot of microorganisms, especially bacteria, and has the capability to remove a lot of contaminants from aqueous medium under both autotrophic and heterotrophic conditions, may be applied to microalgae to produce microalgae-bacteria granules after adapting the AS with a set of certain conditions. The AS may be firstly adapted for producing microalgae-bacteria granules, which may include enriching the AS with desired bacteria that may be needed for producing microalgae-bacteria granules. Therefore, the AS may be treated at a set of certain conditions appropriate for cultivation of the desired bacteria. However, a common drawback of granulation of a mixture of microalgae and bacteria may be related to a time-consuming granulation process which may need almost more than one month for granule cores to appear or for applying a pre-formed AS granule.

Herein, an exemplary method and system are disclosed to overcome several limitations of heterotrophic or autotrophic nitrate removal from water as well as the above-mentioned drawbacks of utilizing microalgae and denitrifying bacteria. An exemplary method and system may include complete and fast nitrate removal from drinking water by producing granules of a mixture of hydrogenotrophic denitrifiers (HTD) and green microalgae in a short time period, and utilizing the produced granules in a hybrid setup of both sequencing batch reactor (SBR) and up-flow anaerobic sludge blanket bioreactor (UASB) for biological nitrate removal from water in the absence of any organic carbon- and energy sources for microbial activity. An exemplary method and system may not need any organic carbon sources as well as any external source for supplying $H_2$ gas, since the utilized microalgae are $H_2$ producers under $CO_2$ injection for HTDs.

An exemplary method may have the ability to be applied instead of conventional biological and non-biological methods for nitrate removal by removing the hydrogen requirement in hydrogenotrophic denitrification. An exemplary method and system may also introduce a granulation process of microalgae-denitrifying bacteria, which may increase the nitrate removal efficiency, settling rate, and the speed of microorganism separation to meet the need of the post-treatment for separation of microbial biomass from treated water. Hence, the simultaneous formation of granule at shortest time and rapid removal of nitrate have been taken into consideration herein with substituting hydrogen gas by three microalgae strains of *Ettlia* sp. YC001, *C. vulgaris*, and *C. reinhardii* at a same inoculated cell number in an exemplary method and system disclosed herein. The microalgae strains may supply required hydrogen for hydrogenotrophic denitrification; thereby, eliminate a requirement for hydrogen gas during nitrate removal from water.

An exemplary method and system may also be related to an integrated use of advantages of both UASB and SBR as a hybrid photobioreactor with a mixture of HTD-green microalgae, allowing for complete nitrate removal, enhancement of effluent quality, and reduction of the settling time.

Hence, an exemplary method may reduce a concentration of more than about 220 mg/L nitrate (50 mg $NO_3^-$—N/L) down to a standard level of about 50 mg/L nitrate (10 mg $NO_3^-$—N/L) or less in less than about 2 hours from water (i.e., hydraulic retention time (HRT) less than about 2 hours) and also, may separate microbial mixture from treated water in less than about 15 minutes.

Figure 1A:
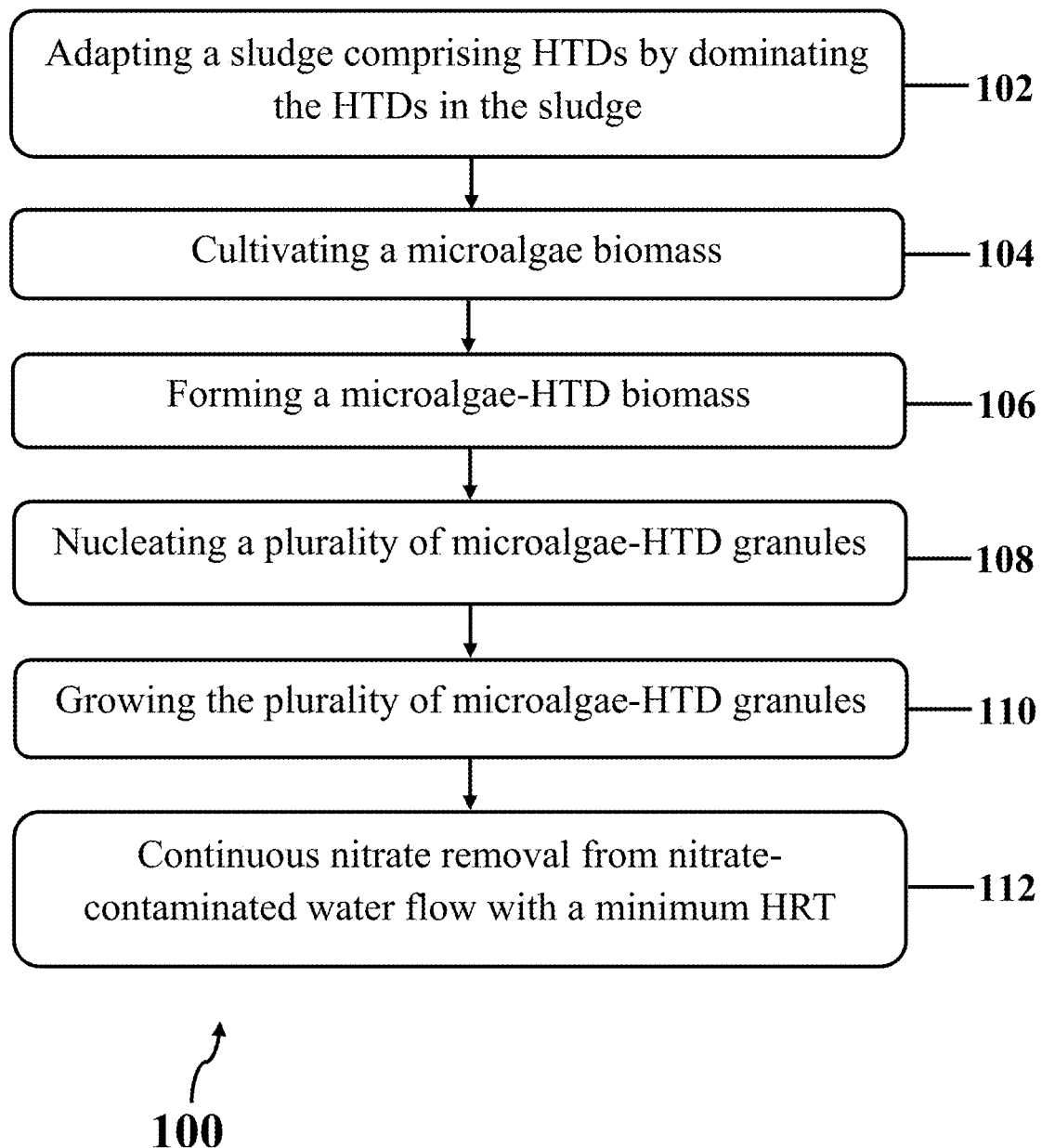
FIG. 1A illustrates an exemplary method for nitrate removal from drinking water, consistent with one or more exemplary embodiments of the present disclosure.

FIG. 1A shows an exemplary method 100 for nitrate removal from drinking water, consistent with one or more exemplary embodiments of the present disclosure. Exemplary method 100 may include adapting a sludge including hydrogenotrophic denitrifiers (HTDs) by dominating the HTDs among a plurality of microorganisms present in the sludge (step 102), cultivating a microalgae biomass (step 104), forming a microalgae-HTD biomass (step 106), nucleating a plurality of microalgae-HTD granules (step 108), and growing the plurality of microalgae-HTD granules (step 110). In an exemplary implementation, method 100 may further include continuous nitrate removal from a continuous flow of nitrate-contaminated water with a minimum HRT over the grown plurality of microalgae-HTD granules (step 112).

In detail, step 102 may include adapting a sludge, which may include HTDs, by dominating the HTDs in the sludge. In an exemplary embodiment, the sludge may include an activated sludge (AS) that may be collected from an anaerobic section of a sewage treatment plant (or a local municipal wastewater treatment plant). The activated sludge may include a plurality of the HTDs.

In an exemplary embodiment, the AS may include a plurality of different microorganisms. Step 102 may include dominating the HTDs among the plurality of different microorganisms in the sludge that may lead to form an adapted sludge with predominant HTDs. In an exemplary implementation, step 102 may include feeding the HTDs in the sludge with a mixture of carbon dioxide ($CO_2$), hydrogen gas ($H_2$), and nitrate-contaminated water. In an exemplary implementation, adapting the sludge may further include reducing nitrate-nitrogen ($NO_3^-$—N) concentration of the nitrate-contaminated water to less than about 5 mg/L during dominating the HTDs in the sludge.

In an exemplary implementation, adapting the sludge including HTDs by dominating the HTDs in the sludge (step 102) may refer to screening the HTDs within the sludge by enriching the sludge respective to the HTDs. In an exemplary implementation, enriching the sludge respective to the HTDs may include raising concentration of HTDs in the sludge.

Figure 1B:
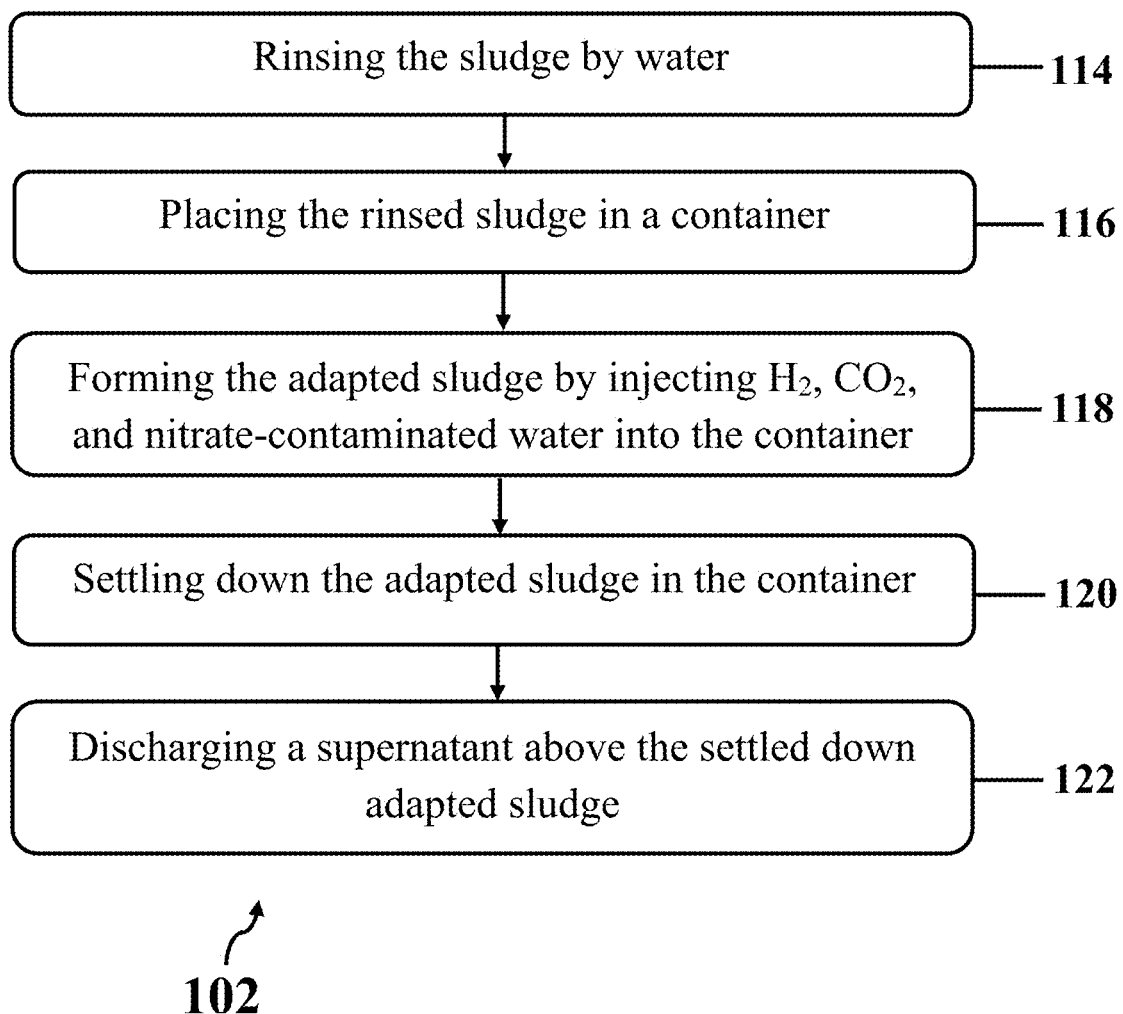
FIG. 1B illustrates an exemplary implementation of an exemplary process for adapting an exemplary sludge including hydrogenotrophic denitrifiers (HTDs) by dominating the HTDs in the sludge, consistent with one or more exemplary embodiments of the present disclosure.

FIG. 1B shows an exemplary implementation of an exemplary process for adapting the sludge including HTDs by dominating the HTDs in the sludge (step 102), consistent with one or more exemplary embodiments of the present disclosure. Adapting the sludge including HTDs by dominating the HTDs in the sludge (step 102) may include rinsing the sludge by water (step 114), placing the rinsed sludge in a container (step 116), forming the adapted sludge by injecting $H_2$, $CO_2$, and nitrate-contaminated water into the container (step 118), settling down the adapted sludge in the container (step 120), and discharging a supernatant above the settled down adapted sludge (step 122). In an exemplary implementation, adapting the sludge including HTDs by dominating the HTDs in the sludge (step 102) may be carried out in less than one month.

In detail, step 114 may include rinsing the sludge by water. In an exemplary implementation, step 114 may include rinsing the sludge with tap water for about one week. In an exemplary implementation, rinsing the sludge may include circulating, passing, or flowing water over the sludge that may be placed in a vessel.

Furthermore, step 116 may include placing the rinsed sludge in a container. In an exemplary embodiment, the container may include a cylindrical container.

Moreover, step 118 may include forming the adapted sludge in the container. In an exemplary implementation, forming the adapted sludge in the container (step 118) may include enriching the sludge with the HTDs by dominating the HTDs within the sludge. In an exemplary implementation, forming the adapted sludge in the container (step 118) may include feeding the HTDs with a mixture of $CO_2$ gas, $H_2$ gas, and the nitrate-contaminated water. In an exemplary implementation, forming the adapted sludge in the container (step 118) may include injecting $CO_2$ gas into the container with a flow rate of between 5 mL/min and 25 mL/min, injecting $H_2$ gas into the container with a flow rate of between 10 mL/min and 30 mL/min, and injecting nitrate-contaminated water into the container with a nitrate concentration in a range between 100 mg/L and 350 mg/L.

In an exemplary implementation, forming the adapted sludge in the container (step 118) may include injecting $CO_2$ gas into the container with a flow rate of between 9 mL/min and 11 mL/min, injecting $H_2$ gas into the container with a flow rate of between 14 mL/min and 16 mL/min, and injecting nitrate-contaminated water into the container with a nitrate concentration in a range between 220 mg/L and 222 mg/L. In an exemplary embodiment, such ranges for $CO_2$ gas and $H_2$ gas may allow for avoiding sudden drop in pH within the container, and complete mixing of the sludge, $CO_2$ gas, $H_2$ gas, and the nitrate-contaminated water within the container. In an exemplary embodiment, forming the adapted sludge may include dominating HTDs respective to other microorganisms in the sludge that may lead to enrich the sludge with the HTDs, and removing nitrate completely from the nitrate-contaminated water.

In an exemplary implementation, injecting the nitrate-contaminated water into the container may include injecting at least one of nitrate-contaminated drinking water, pristine mountain water, synthetic nitrate-contaminated water, tap water, ground water, and combinations thereof. In an exemplary implementation, injecting the nitrate-contaminated water into the container may include injecting the synthetic nitrate-contaminated water including tap water containing $NO_3^-$—N with a concentration between 20 mg/L and 80 mg/L, and $PO_4^{3-}$—P with a concentration between 3 mg/L and 13 mg/L. In an exemplary implementation, injecting the nitrate-contaminated water into the container may include injecting the tap water containing $NO_3^-$—N with a concentration between 49 mg/L and 51 mg/L, and $PO_4^{3-}$—P with a concentration between 9 mg/L and 11 mg/L. In an exemplary embodiment, the tap water may include at least one salt of $KNO_3$, $NaNO_3$, and combinations thereof with the $NO_3^-$—N concentration between 20 mg/L and 80 mg/L, and at least one salt of $KH_2PO_4$, $NaH_2PO_4$, and combinations thereof with the $PO_4^{3-}$—P concentration between 3 mg/L and 13 mg/L.

In an exemplary implementation, forming the adapted sludge in the container (step 118) may further include stirring a mixture of the rinsed sludge, the injected $CO_2$ gas, the injected $H_2$ gas, and the injected nitrate-contaminated water in the container. In an exemplary implementation, stirring the mixture of the rinsed sludge, the injected $CO_2$ gas, the injected $H_2$ gas, and the injected nitrate-contaminated water in the container may include rotating a mechanical stirrer in the container at a rotating speed in a range between about 15 rpm and about 40 rpm, for example, 20 rpm. In an exemplary embodiment, stirring the mixture in the container may allow for a complete mixing of the rinsed sludge, the injected $CO_2$ gas, the injected $H_2$ gas, and the injected nitrate-contaminated water within the container, and keeping a dissolved oxygen concentration within the container below about 0.5 mg/L to 4 mg/L (e.g. 2 mg/L) to make anaerobic condition for activity of HTDs. In an exemplary implementation, forming the adapted sludge in the container (step 118) may be carried out between 10 days to 30 days. In an exemplary implementation, forming the adapted sludge in the container (step 118) may be carried out during about 20 days.

In an exemplary implementation, adapting the sludge including HTDs by dominating the HTDs in the sludge (step 102) may further include settling down the adapted sludge that may be formed in the container (step 120), and discarding an upper supernatant above the settled down adapted sludge (step 122). In an exemplary implementation, forming the adapted sludge (step 118), settling down the adapted sludge (step 120), and discharging the supernatant (step 122) may be done iteratively in one or more 2-day cycles. In such implementations, every 2 days, fresh $CO_2$ gas, fresh $H_2$ gas, and fresh nitrate-contaminated water may be injected into the container (step 118), the adapted sludge may be settled down (step 120), and the supernatant above the settled adapted sludge may be discharged (step 122).

In an exemplary implementation, settling down the adapted sludge (step 120) may include stopping injection of the $CO_2$ and the $H_2$ gases into the container and stopping stirring of contents within the container. In an exemplary implementation, settling down the adapted sludge in the container may be carried out in a time period between about 10 minutes and about 1 hour. In an exemplary implementation, settling down the adapted sludge in the container may be carried out in about 30 minutes.

In an exemplary implementation, discarding the upper supernatant above the settled down adapted sludge (step 122) may include driving the upper supernatant out from the container while the injection of the $CO_2$ and the $H_2$ gases into the container and stirring of contents within the container are stopped.

Referring to FIG. 1A, step 104 may include cultivating a microalgae biomass, which may produce required hydrogen for HTDs in subsequent steps (steps 106, 108, 110, and 112) of exemplary method 100. In an exemplary implementation, cultivating the microalgae biomass (step 104) may include cultivating a microalgae strain, which may include at least one of an *Ettlia* sp. strain, a *C. vulgaris* strain, a *C. reinhardtii* strain, and combinations thereof. In an exemplary implementation, cultivating the microalgae biomass may include cultivating two or more microalgae strains of the *Ettlia* sp. strain, the *C. vulgaris* strain, and the *C. reinhardtii* strain. In an exemplary implementation, cultivating the microalgae biomass may include cultivating a mixture of two or more microalgae strains of the *Ettlia* sp. strain, the *C. vulgaris* strain, and the *C. reinhardtii* strain with equal cell numbers of the two or more microalgae strains. In an exemplary implementation, cultivating the microalgae biomass may include cultivating a mixture of the *Ettlia* sp. strain, the *C. vulgaris* strain, and the *C. reinhardtii* strain with equal cell numbers of the *Ettlia* sp. strain, the *C. vulgaris* strain, and the *C. reinhardtii* strain. In an exemplary implementation, cultivating the two or more microalgae strains may include cultivating each of the two or more microalgae strains separately and cultivating a mixture of the separately cultivated two or more microalgae strains with equal cell numbers of the cultivated two or more microalgae strains.

Figure 1C:
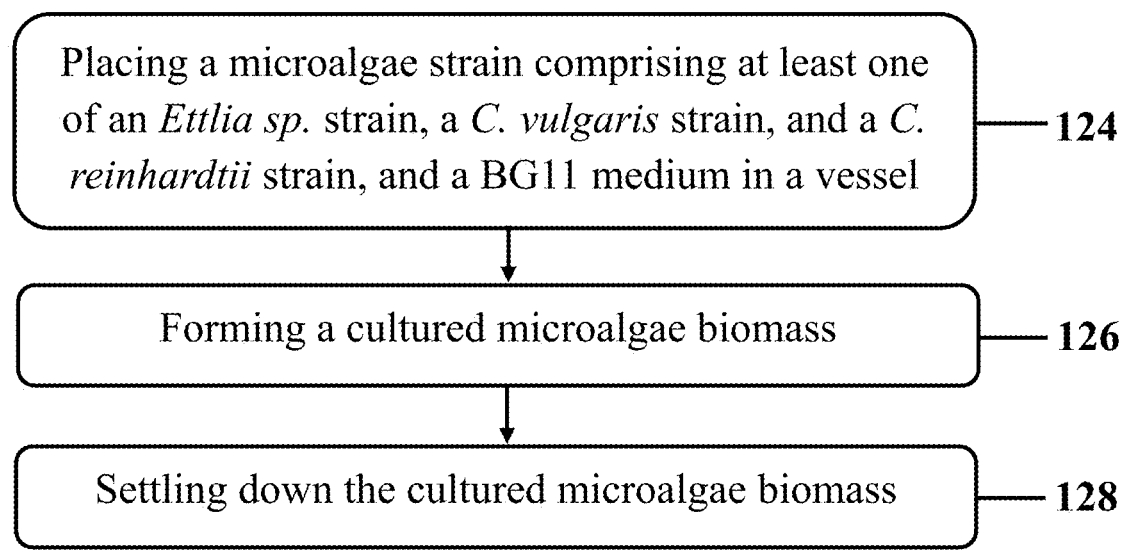
FIG. 1C illustrates an exemplary implementation of an exemplary process for cultivating an exemplary microalgae biomass, consistent with one or more exemplary embodiments of the present disclosure.

FIG. 1C shows an exemplary implementation of an exemplary process for cultivating the microalgae biomass (step 104), consistent with one or more exemplary embodiments of the present disclosure. Cultivating the microalgae biomass (step 104) may include placing the microalgae strain and a BG11 medium (Blue-Green Medium) in a vessel (step 124), forming a cultured microalgae biomass (step 126), and settling down the cultured microalgae biomass (step 128).

In detail, step 124 may include placing the microalgae strain and a BG11 medium (Blue-Green Medium) in a vessel. In an exemplary implementation, step 124 may further include preparing the BG11 medium, autoclaving the prepared BG11 medium, cooling the autoclaved BG11 medium, and inoculating the microalgae strain to the cooled BG11 medium. In an exemplary embodiment, the vessel may include at least one of a beaker, an Erlen, a flask, and any container for liquids.

Figure 1D:
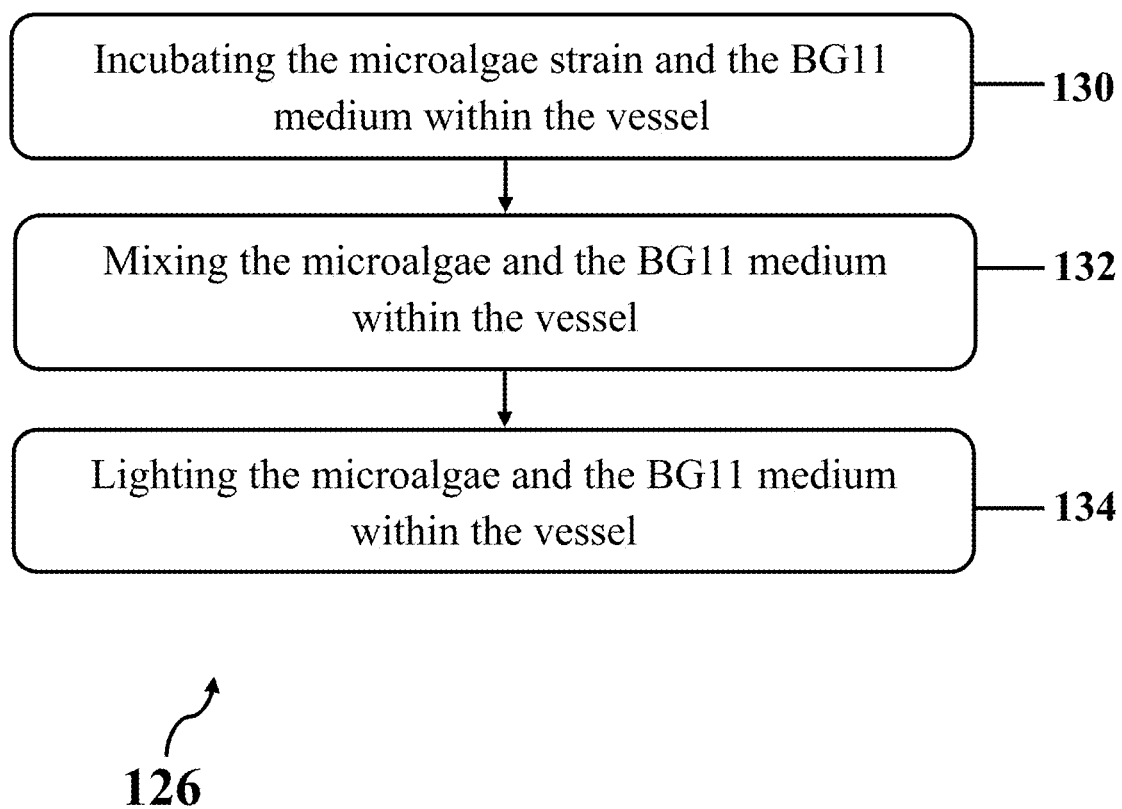
FIG. 1D illustrates an exemplary implementation of an exemplary process for forming an exemplary cultured microalgae biomass, consistent with one or more exemplary embodiments of the present disclosure.

Furthermore, step 126 may include forming a cultured microalgae biomass. FIG. 1D shows an exemplary implementation of an exemplary process for forming the cultured microalgae biomass (step 126), consistent with one or more exemplary embodiments of the present disclosure. Forming the cultured microalgae biomass (step 126) may include incubating the microalgae strain and the BG11 medium within the vessel (step 130), mixing the microalgae and the BG11 medium within the vessel (step 132), and lighting the microalgae and the BG11 medium within the vessel (step 134). In an exemplary implementation, incubating the microalgae strain and the BG11 medium (step 130), mixing the microalgae and the BG11 medium (step 132), and lighting the microalgae and the BG11 medium (step 134) may be carried out concurrently for a time interval in a range between 4 days and 14 days, for example, in about one week.

In an exemplary implementation, incubating the microalgae strain and the BG11 medium within the vessel (step 130) may include incubating the microalgae strain and the BG11 medium within the vessel at a temperature in a range between about 23° C. and about 33° C. In an exemplary implementation, incubating the microalgae strain and the BG11 medium within the vessel (step 130) may include incubating the microalgae strain and the BG11 medium within the vessel at a temperature in a range between about 26° C. and about 28° C.

In an exemplary implementation, mixing the microalgae and the BG11 medium within the vessel (step 132) may include mixing the microalgae and the BG11 medium within the vessel at a mixing speed between 120 rpm and 220 rpm. In an exemplary implementation, incubating the microalgae strain and the BG11 medium within the vessel (step 130), and mixing the microalgae and the BG11 medium within the vessel (step 132) may be carried out via placing the vessel containing the microalgae strain and the BG11 medium in an incubator shaker.

In an exemplary implementation, lighting the microalgae and the BG11 medium (step 134) may include lighting the microalgae and the BG11 medium by continuously emitting white light onto surface of the vessel using a light-emitting diode (LED) as an irradiance source with an intensity in a range between 200 µmol/m$^2$/s and 400 µmol/m$^2$/s, for example, 250 µmol/m$^2$/s.

Moreover, step 128 may include settling down the cultured microalgae biomass, which may be obtained from step 126. In an exemplary implementation, settling down the cultured microalgae biomass may include settling down the cultured microalgae biomass, and removing supernatant above the settled down cultured microalgae biomass.

In an exemplary implementation, cultivating the microalgae biomass (step 104) may include cultivating a mixture of two or more microalgae strains with equal cell number of the two or more microalgae strains. In such implementation, cultivating the microalgae biomass (step 104) may include cultivating each of the two or more microalgae strains, separately, and cultivating the mixture of the separately cultivated two or more microalgae strains with equal cell numbers of the separately cultivated two or more microalgae strains. Accordingly, the process of FIG. 1C, as described above, may further include transferring a mixture of two or more pre-cultivated microalgae biomass to a container containing BG11 medium, forming a mix-cultured microalgae biomass, and settling down the mix-cultured microalgae biomass. In an exemplary embodiment, the mixture of the two or more pre-cultivated microalgae biomass may include equal amounts of each of the settled down cultured microalgae biomass associated with each of the two or more microalgae strains, which may be obtained from cultivation process of FIG. 1C.

In an exemplary implementation, forming the mix-cultured microalgae biomass may include incubating the mixture of the pre-cultivated microalgae and the BG11 medium in the container at a temperature in a range between 23° C. and 33° C., mixing the mixture of the pre-cultivated microalgae and the BG11 medium in the container at a mixing speed between 120 rpm and 220 rpm, and lighting the mixture of the pre-cultivated microalgae and the BG11 medium in the container with an intensity in a range between 200 µmol/m$^2$/s and 400 µmol/m$^2$/s, for example, 250 µmol/m$^2$/s. In an exemplary implementation, incubating the mixture of the pre-cultivated microalgae and the BG11 medium, mixing the mixture of the pre-cultivated microalgae and the BG11 medium, and lighting the mixture of the pre-cultivated microalgae and the BG11 medium may be carried out concurrently for a time interval in a range between 4 days and 14 days, for example, during about one week.

Figure 2:
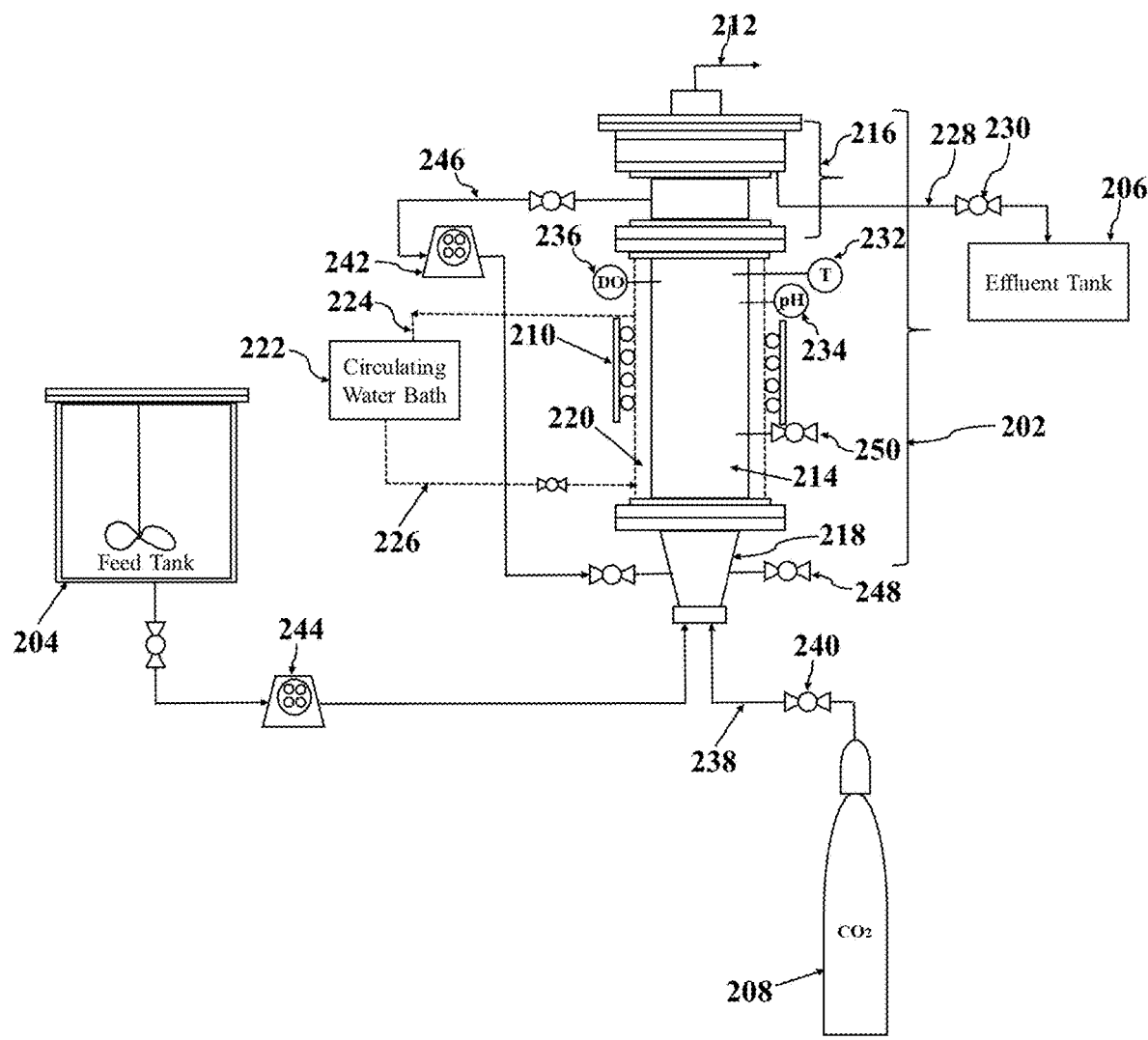
FIG. 2 illustrates a schematic flow diagram of an exemplary implementation of an exemplary setup for nitrate removal from drinking water, consistent with one or more exemplary embodiments of the present disclosure.

In an exemplary implementation, an exemplary setup may be utilized to perform exemplary method 100 for nitrate removal from drinking water. FIG. 2 shows a schematic flow diagram of an exemplary implementation of an exemplary setup 200 for nitrate removal from drinking water, consistent with one or more exemplary embodiments of the present disclosure. In an exemplary embodiment, exemplary setup 200 may include a photobioreactor 202, a feed tank 204, an effluent tank 206, a $CO_2$ reservoir 208, a set of light emitting diodes (LEDs) 210 located around an internal surface of photobioreactor 202, and a ventilation path 212.

In an exemplary embodiment, photobioreactor 202 may include a hybrid photobioreactor, which may be capable of performing reactions with both sequencing batch (SB) (similar to SBR), and up flow (UF) (similar to UASB) modes therein. In an exemplary embodiment, photobioreactor 202 may be configured to produce a plurality of microalgae-HTD granules utilizing properties of both SB and UF conditions, and remove nitrate from nitrate-contaminated water using the produced microalgae-HTD granules therein. In an exemplary embodiment, photobioreactor 202 may include an active internal part 214, a separator part 216 that may be located on top of active internal part 214, and a conical part 218 that may be located at the bottom of active internal part 214. In an exemplary embodiment, active internal part 214 and separator part 216 may be in a cylindrical shape. In an exemplary embodiment, active internal part 214, separator part 216, and conical part 218 may be made of at least one of glass, acrylic, plexiglass, steel, and stainless steel.

In an exemplary embodiment, photobioreactor 202 may further include an outer cylindrical layer 220 that may be located around active internal part 214. In an exemplary embodiment outer cylindrical layer 220 may be made of at least one of glass, acrylic, plexiglass, plexiglass, steel, and stainless steel. In an exemplary embodiment, outer cylindrical layer 220 may be configured to act as a thermal jacket, allowing for controlling temperature within photobioreactor 202 that may include controlling inside temperature of photobioreactor 202 at a range between 23° C. and 33° C. In an exemplary embodiment, outer cylindrical layer 220 may be configured to circulate a liquid, for example, water, around active internal part 214. In such exemplary embodiments, setup 200 may further include a circulating water bath 222 and respective lines 224 and 226. In such exemplary embodiments, circulating water bath 222, and respective lines 224 and 226 may be configured to circulate water through outer cylindrical layer 220 of photobioreactor 202.

In an exemplary embodiment, effluent tank 206 may be configured to collect outflow of photobioreactor 202 therein. In an exemplary embodiment, the outflow of photobioreactor 202 may include clean water from nitrate contaminations, residual microbial biomass, and combinations thereof. The outflow of photobioreactor 202 may be discharged through line 228 utilizing valve 230 from top of photobioreactor 202, and may be collected in effluent tank 206.

In an exemplary embodiment, set of light emitting diodes (LEDs) 210 may be configured to act as a required light source for reactions in photobioreactor 202. In an exemplary embodiment, set of LEDs 210 may be configured to light contents within photobioreactor 202; allowing for improving nitrate removal efficiency and microalgae growth via photosynthesis and hydrogen production inside photobioreactor 202. In an exemplary embodiment, set of LEDs 210 may include two set of LEDs, which may be located around an outer surface of photobioreactor 202 facing each other. In an exemplary embodiment, set of LEDs 210 may include one or more white LEDs that may be connected to a power supply (not illustrated) and may supply the required light for reactions in photobioreactor 202 by adjusting an appropriate voltage.

In an exemplary embodiment, ventilation path 212 may be configured to remove undesirable gases and vapors from photobioreactor 202 as an overflow from top of photobioreactor 202. For example, nitrogen gas ($N_2$), which may be a side product of reactions in photobioreactor 202, may be removed from photobioreactor 202 through ventilation path 212.

In an exemplary embodiment, $CO_2$ reservoir 208 may be configured to supply required amount of carbon inside photobioreactor 202. In an exemplary embodiment, $CO_2$ may be entered via line 238 from bottom of photobioreactor 202 through a spherical sparger (not illustrated), which may be embedded at the bottom of photobioreactor 202. A pH value inside photobioreactor 202 may be a criterion (controlling parameter) for adjusting flow rate of $CO_2$. The pH value inside photobioreactor 202 may be measured by a pH sensor 234, and pH value may be adjusted in a range between 6.5 and 7.5 by adjusting flow rate of $CO_2$. A check valve 240 may be placed on line 238, allowing for preventing water from entering $CO_2$ reservoir 208.

In an exemplary embodiment, temperature sensor 232 and dissolved oxygen (DO) sensors 236 may also be attached to photobioreactor 202. Temperature and DO may be two other controlling parameter of operational conditions inside photobioreactor 202 that should be checked constantly.

In an exemplary embodiment, exemplary setup 200 may further include two peristaltic pumps that may include a first peristaltic pump 242 and a second peristaltic pump 244. In an exemplary embodiment, first peristaltic pump 242 may be configured to recirculate a part of content of photobioreactor 202 from separator part 216 through line 262; allowing for mixing contents within photobioreactor 202. In an exemplary embodiment, second peristaltic pump 244 may be configured to inject a feed flow from feed tank 204 into photobioreactor 202. In an exemplary embodiment, second peristaltic pump 244 may be configured to inject the feed flow from feed tank 204 into photobioreactor 202 with changing flow rates; allowing for preparing different HRTs for feed flow rate. In an exemplary embodiment, the feed may be injected into photobioreactor 202 with a desired amount of HRT utilizing second peristaltic pump 244. In such embodiments, second peristaltic pump 244 may be adjusted to control a flow rate of feed that may be injected into photobioreactor 202 to obtain the desired amount of HRT. In an exemplary embodiment, feed tank 204 may include nitrate-contaminated water.

Referring to FIG. 1A, step 106 may include forming a microalgae-HTD biomass. In an exemplary implementation, with reference to FIG. 2, forming the microalgae-HTD biomass (step 106) may include forming the microalgae-HTD biomass by cultivating a mixture of the adapted sludge with predominant HTDs and the cultivated microalgae biomass in nitrate-contaminated water inside exemplary photobioreactor 202 in a batch mode at a set of controlled operational conditions. In an exemplary implementation, forming the microalgae-HTD biomass may include reducing nitrate-nitrogen concentration of the nitrate-contaminated water to less than about 5 mg $NO_3^-$—N/L.

In an exemplary embodiment, the nitrate-contaminated water may contain a nitrate ($NO_3^-$) concentration of more than about 200 mg/L. In an exemplary embodiment, the nitrate-contaminated water may contain a nitrate ($NO_3^-$) concentration in a range between about 100 mg/L and about 350 mg/L, for example, 220 mg/L. In an exemplary embodiment, the nitrate-contaminated water may include at least one of nitrate-contaminated drinking water, pristine mountain water, tap water, ground water, synthetic nitrate-contaminated water, and combinations thereof. In an exemplary embodiment, the nitrate-contaminated water may include tap water, which may include at least one salt of $KNO_3$, $NaNO_3$, and combinations thereof with a $NO_3^-$—N concentration between about 20 mg/L and about 80 mg/L (e.g. 50 mg/L), and at least one salt of $KH_2PO_4$, $NaH_2PO_4$, and combinations thereof with a $PO_4^{3-}$—P concentration between about 3 mg/L and about 13 mg/L (e.g. 10 mg/L).

In an exemplary implementation, the set of controlled operational conditions may include keeping temperature of contents within photobioreactor 202 at a range between about 23° C. and about 33° C. by circulating a liquid through outer cylindrical layer 220 around photobioreactor 202, keeping pH value of the contents within photobioreactor 202 in a range between 6.5 and 7.5 by controlling injection of $CO_2$ via line 238 to photobioreactor 202, and applying a light-dark cycle to the contents within photobioreactor 202. In an exemplary implementation, applying the light-dark cycle to the contents within photobioreactor 202 may include lighting the contents within photobioreactor 202 for a time period between about 13 hours and about 19 hours with a light intensity inside photobioreactor 202 in a range between about 200 µmol/m²/s and about 400 µmol/m²/s (e.g. 250 µmol/m²/s) using set of LEDs 210 located around photobioreactor 202, and turning off set of LEDs 210 for a time period between about 5 hours and about 11 hours. In an exemplary implementation, lighting the contents within photobioreactor 202, and turning off set of LEDs 210 may be carried out sequentially after each other.

Figure 1E:
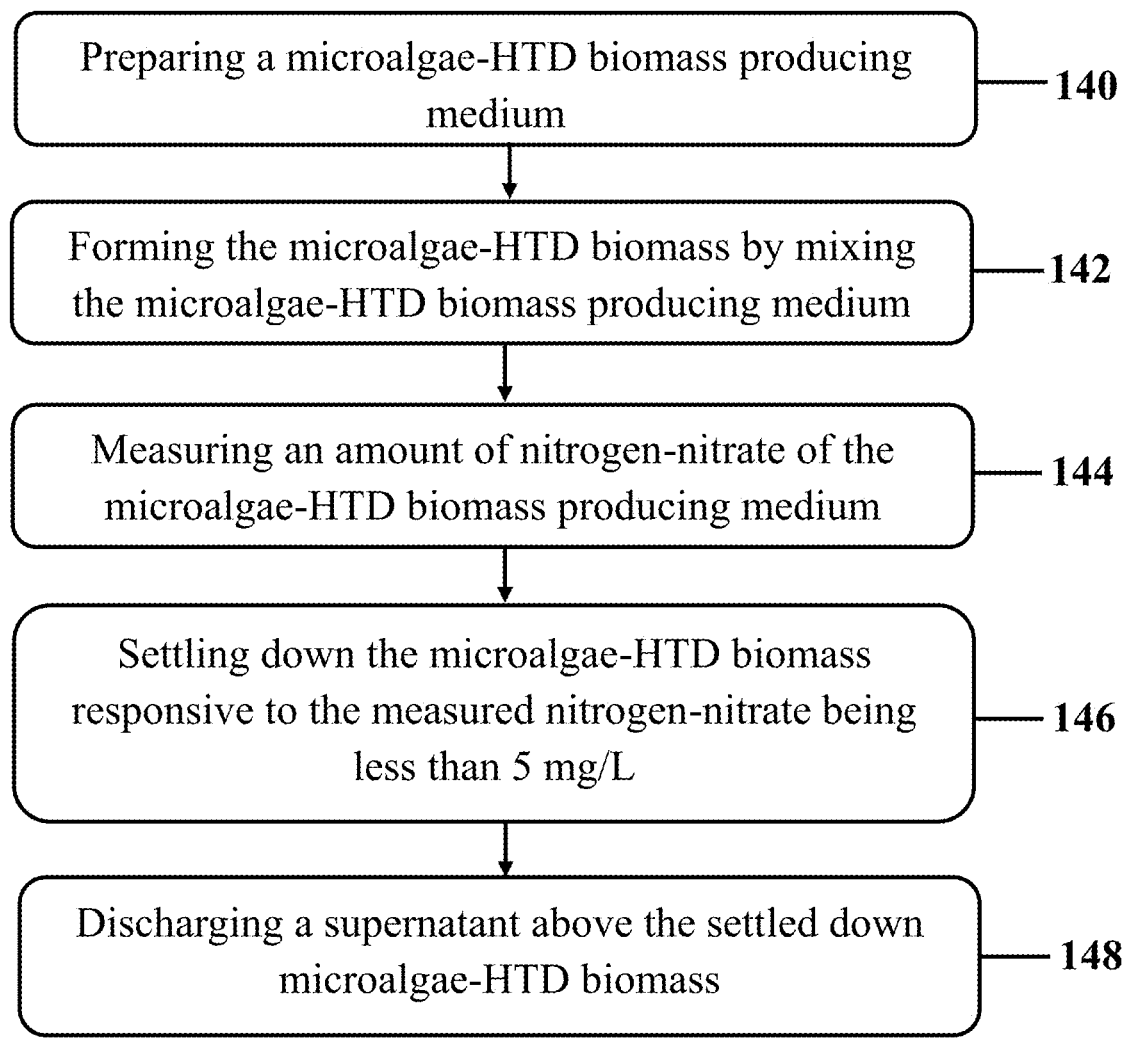
FIG. 1E illustrates an exemplary implementation of an exemplary process for forming an exemplary microalgae-HTD biomass, consistent with one or more exemplary embodiments of the present disclosure.

FIG. 1E shows an exemplary implementation of an exemplary process for forming the microalgae-HTD biomass (step 106), consistent with one or more exemplary embodiments of the present disclosure. Forming the microalgae-HTD biomass (step 106) may include preparing a microalgae-HTD biomass producing medium (step 140), forming the microalgae-HTD biomass by mixing the microalgae-HTD biomass producing medium (step 142), measuring an amount of nitrogen-nitrate ($NO_3^-$—N) of the microalgae-HTD biomass producing medium (step 144), settling down the microalgae-HTD biomass responsive to the measured amount of nitrogen-nitrate ($NO_3^-$—N) being less than about 5 mg/L (step 146), and discharging a supernatant above the settled down microalgae-HTD biomass (step 148).

In an exemplary implementation, preparing the microalgae-HTD biomass producing medium (step 140) may include feeding the nitrate-contaminated water to photobioreactor 202 with an amount equal to a working volume of photobioreactor 202, adding (inoculating) the mixture of the adapted sludge with predominant HTDs and the cultivated microalgae biomass to the fed nitrate-contaminated water to photobioreactor 202, and injecting $CO_2$ to the photobioreactor 202 with a flow rate between about 70 mL/min and about 200 mL/min, for example, 100 mL/min. In an exemplary implementation, injecting $CO_2$ to photobioreactor 202 may include injecting $CO_2$ from reservoir $CO_2$ 208 to photobioreactor 202; allowing for supplying inorganic carbon resource for both HTDs and microalgae; thereby, resulting in microalgae-HTD biomass production.

In an exemplary embodiment, the mixture of the adapted sludge with predominant HTDs and the cultivated microalgae biomass may have a mass ratio of the adapted sludge with predominant HTDs respective to the cultivated microalgae biomass in a range between about 0.5 and 1.5. In an exemplary implementation, adding (inoculating) the mixture of the adapted sludge with predominant HTDs and the cultivated microalgae biomass to the fed nitrate-contaminated water to photobioreactor 202 may include adding (inoculating) the mixture of the adapted sludge with predominant HTDs and the cultivated microalgae biomass with a 1:1 mass ratio to the fed nitrate-contaminated water to photobioreactor 202.

In an exemplary implementation, preparing the microalgae-HTD biomass producing medium (step 140) may further include injecting nitrogen ($N_2$) gas into photobioreactor 202 after feeding the nitrate-contaminated water to photobioreactor 202; allowing for purge of oxygen ($O_2$) gas from photobioreactor 202 to keep anaerobic conditions within photobioreactor 202 for forming microalgae-HTD biomass.

Furthermore, mixing the microalgae-HTD biomass producing medium (step 142) may include mixing the microalgae-HTD biomass producing medium by circulating a part of the microalgae-HTD biomass producing medium using first peristaltic pump 242 (step 142).

Moreover, step 144 may include measuring an amount of nitrogen-nitrate ($NO_3^-$—N) of the microalgae-HTD biomass producing medium within photobioreactor 202. In an exemplary implementation, measuring the amount of nitrogen-nitrate ($NO_3^-$—N) of the microalgae-HTD biomass may include taking a sample of the microalgae-HTD biomass via sampling valve 248 and measuring the amount of nitrogen-nitrate ($NO_3^-$—N) of the sample of the microalgae-HTD biomass. In an exemplary implementation, measuring the amount of nitrogen-nitrate ($NO_3^-$—N) of the sample of the microalgae-HTD biomass may be done consistent with a standard procedure of American Public Health Association (APHA).

In addition, step 146 may include settling down the microalgae-HTD biomass responsive to the measured amount of nitrogen-nitrate ($NO_3^-$—N) being less than about 5 mg/L. In an exemplary implementation, forming the microalgae-HTD biomass in step 142 may include consuming nitrogen-nitrate ($NO_3^-$—N) of the fed nitrate-contaminated water into photobioreactor 202, which may lead to gradually decreasing the amount of nitrogen-nitrate ($NO_3^-$—N) within photobioreactor 202. In an exemplary implementation, the amount of nitrogen-nitrate ($NO_3^-$—N) may be decrease to less than about 5 mg/L, and/or may be completely eliminated after a few days which may be less than a week. When the measured amount of nitrogen-nitrate ($NO_3^-$—N) is reduced to less than about 5 mg/L, the microalgae-HTD biomass may be settled down by stopping $CO_2$ injection, and turning off set of LEDs 210, and settling down the microalgae-HTD biomass in a settling time between about 10 minutes and 1 hour.

Additionally, step 148 may include discharging a supernatant above the settled down microalgae-HTD biomass. In an exemplary implementation, discharging the supernatant above the settled down microalgae-HTD biomass may include discharging the supernatant above the settled down microalgae-HTD biomass by a solenoid valve 250, which may be placed in the middle of photobioreactor 202. In an exemplary implementation, discharging the supernatant above the settled down microalgae-HTD biomass may include discharging about half volume of photobioreactor 202 by solenoid valve 250 during less than about 10 minutes.

Referring again to FIG. 1A, step 108 may include nucleating a plurality of microalgae-HTD granules. In an exemplary implementation, nucleating the plurality of microalgae-HTD granules (step 108) may include nucleating the plurality of microalgae-HTD granules by cultivating the formed microalgae-HTD biomass in nitrate-contaminated water inside photobioreactor 202 in a sequencing batch (SB) mode with a constant HRT. In an exemplary implementation, nucleating the plurality of microalgae-HTD granules may further include reducing nitrate-nitrogen ($NO_3^-$—N) concentration of the nitrate-contaminated water to less than about 5 mg/L.

Figure 1F:
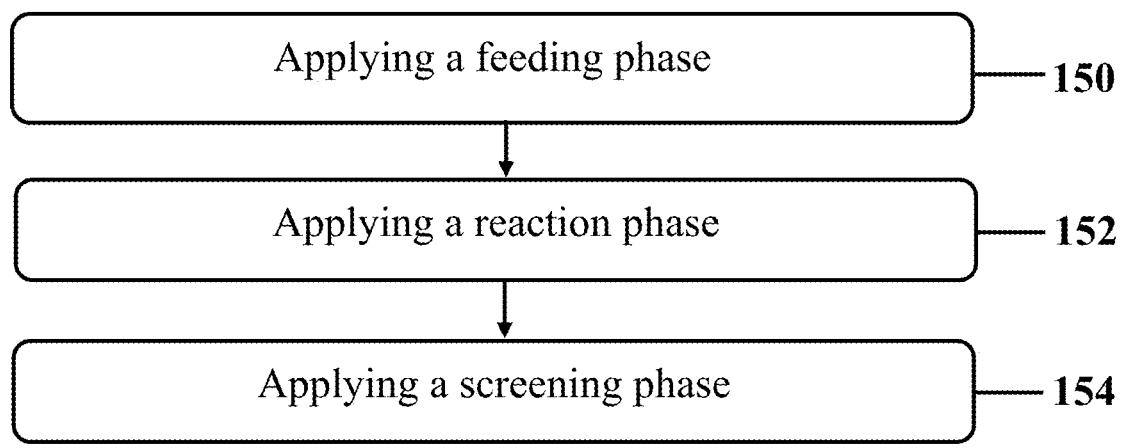
FIG. 1F illustrates an exemplary implementation of an exemplary process for nucleating a plurality of microalgae-HTD granules, consistent with one or more exemplary embodiments of the present disclosure.

FIG. 1F shows an exemplary implementation of an exemplary process for nucleating the plurality of microalgae-HTD granules (step 108), consistent with one or more exemplary embodiments of the present disclosure. Nucleating the plurality of microalgae-HTD granules may include applying a feeding phase (step 150), applying a reaction phase at the set of controlled operational conditions (step 152), and applying a screening phase (step 154). In an exemplary implementation, applying the feeding phase (step 150), applying the reaction phase (step 152), and applying the screening phase (step 154) may be carried out sequentially after each other in a cycle with the constant HRT between about 1 day and 6 days.

In an exemplary implementation, applying the feeding phase (step 150) may include feeding the nitrate-contaminated water into photobioreactor 202 using second peristaltic pump 244.

In an exemplary implementation, applying the reaction phase at the set of controlled operational conditions (step 152) may include generating the reaction phase within photobioreactor 202 by setting the set of controlled operational conditions. In an exemplary implementation, setting the set of controlled operational conditions may include turning second peristaltic pump 244 off, keeping pH value of the contents within photobioreactor 202 in a range between 6.5 and 7.5 by injecting $CO_2$ to photobioreactor 202 with a flow rate between about 70 mL/min and about 200 mL/min, mixing the fed nitrate-contaminated water and the microalgae-HTD biomass by circulating a part of contents within photobioreactor 202 using first peristaltic pump 242, keeping temperature of contents within photobioreactor 202 at a range between about 23° C. and about 33° C. by circulating a liquid through outer cylindrical layer 220 around photobioreactor 202, and applying the light-dark cycle to the contents within the photobioreactor.

In an exemplary implementation, applying the light-dark cycle to the contents within photobioreactor 202 may include lighting the contents within photobioreactor 202 for a time period between about 13 hours and about 19 hours with a light intensity inside photobioreactor 202 in a range between about 200 $\mu mol/m^2/s$ and about 400 $\mu mol/m^2/s$ using set of LEDs 210 located around photobioreactor 202, and turning off set of LEDs 210 for a time period between about 5 hours and about 11 hours. In an exemplary implementation, lighting the contents within photobioreactor 202, and turning off set of LEDs 210 may be carried out sequentially after each other.

In an exemplary implementation, applying the screening phase (step 154) may include settling down the mixed nitrate-contaminated water and microalgae-HTD biomass for a time duration between 10 minutes and 1 hour, and discharging a supernatant above the settled down mixed nitrate-contaminated water and microalgae-HTD biomass. In an exemplary embodiment, the discharged supernatant may be equal to about half of volume of contents within photobioreactor 202, which may be discharged from photobioreactor 202 via solenoid valve 250.

In an exemplary implementation, applying the screening phase (step 154) may allow for assisting high-settleable and strong nucleated plurality of microalgae-HTD granules to stay more in photobioreactor 202 for further growing in step 110, and removing weak, low-settleable and floating (suspended) nucleated plurality of microalgae-HTD granules from photobioreactor 202. In an exemplary embodiment, the low-settleable and floating (suspended) nucleated plurality of microalgae-HTD granules may include microalgae-HTD granules with zeta potential values with large negative values. In an exemplary embodiment, the high-settleable and strong nucleated plurality of microalgae-HTD granules may include microalgae-HTD granules with zero-approached negative values of zeta potential with an increasing trend.

In an exemplary implementation, values of two parameters, including amount of nitrogen-nitrate ($NO_3^-$—N) and zeta potential of the mixed nitrate-contaminated water and microalgae-HTD biomass may be measured and monitored successively. A sudden increase in the measured zeta potential may be an indicator of nucleating the microalgae-HTD granules, and a faster growth of the microalgae-HTD granules may be obtained in the UF mode with a reducing HRT. Additionally, an amount of nitrogen-nitrate ($NO_3^-$—N) may be reduced continuously during nucleating the plurality of microalgae-HTD granules (step 108); thereby, resulting in reducing nitrate-nitrogen ($NO_3^-$—N) concentration of the fed nitrate-contaminated water to less than about 5 mg/L.

Referring again to FIG. 1A, step 110 may include growing the plurality of microalgae-HTD granules. In an exemplary implementation, growing the plurality of microalgae-HTD granules (step 110) may include growing the plurality of microalgae-HTD granules by cultivating the nucleated plurality of microalgae-HTD granules in nitrate-contaminated water inside photobioreactor 202 in an up flow (UF) mode at the set of controlled operational conditions with a reducing hydraulic retention time (HRT). In an exemplary implementation, growing the plurality of microalgae-HTD granules may include reducing nitrate-nitrogen ($NO_3^-$—N) concentration of the nitrate-contaminated water to less than about 5 mg $NO_3^-$—N/L.

Figure 1G:
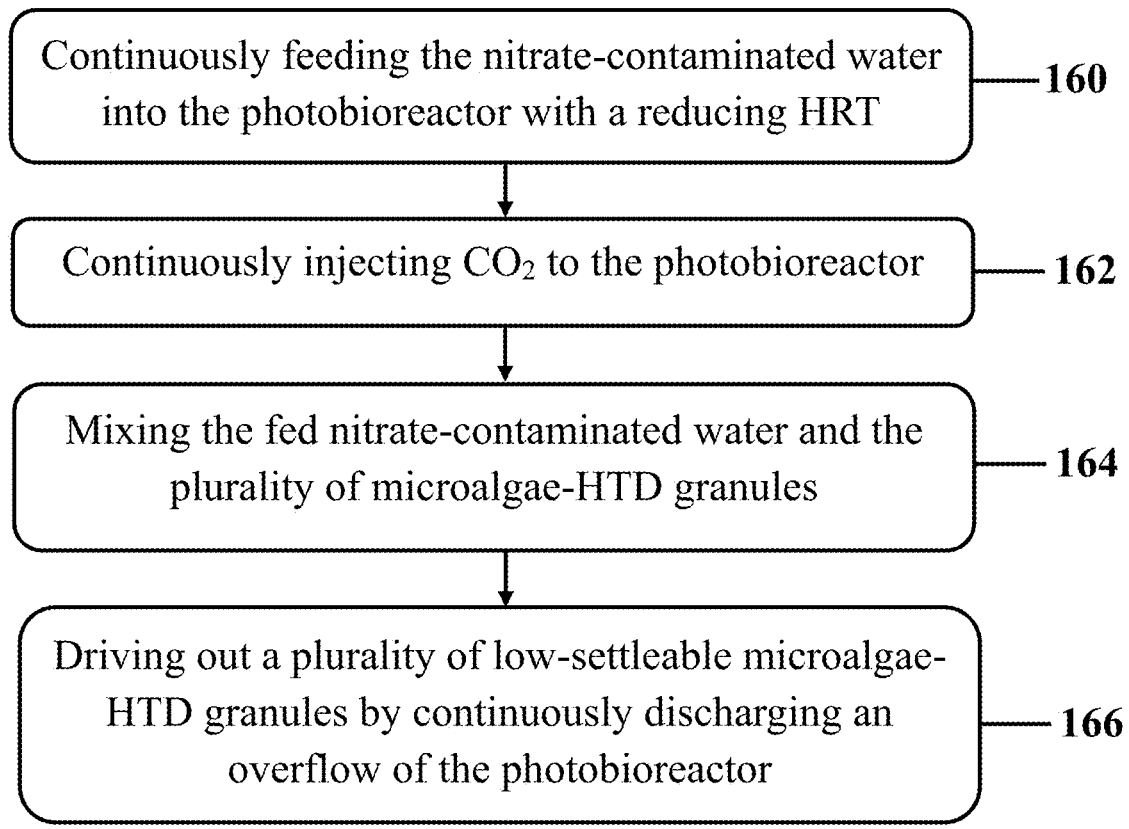
FIG. 1G illustrates an exemplary implementation of an exemplary process for growing the plurality of microalgae-HTD granules, consistent with one or more exemplary embodiments of the present disclosure.

FIG. 1G shows an exemplary implementation of an exemplary process for growing the plurality of microalgae-HTD granules (step 110), consistent with one or more exemplary embodiments of the present disclosure. Growing the plurality of microalgae-HTD granules (step 110) may include continuously feeding the nitrate-contaminated water into photobioreactor 202 with a reducing HRT from the constant HRT to a minimum HRT using second peristaltic pump 244 (step 160), continuously injecting $CO_2$ to photobioreactor 202 with a flow rate between 70 mL/min and 200 mL/min (step 162), mixing the fed nitrate-contaminated water and the plurality of microalgae-HTD granules by circulating a part of contents within photobioreactor 202 using first peristaltic pump 242 (step 164), and driving out a plurality of low-settleable microalgae-HTD granules by continuously discharging an overflow of photobioreactor 202 (step 166). Where, the overflow may include the plurality of low-settleable microalgae-HTD granules.

In detail, step 160 may include continuously feeding the nitrate-contaminated water into photobioreactor 202 with a reducing HRT from the constant HRT to a minimum HRT using second peristaltic pump 244. In an exemplary implementation, continuously feeding the nitrate-contaminated water into photobioreactor 202 with the reducing HRT may include continuously feeding the nitrate-contaminated water from feed tank 204 into photobioreactor 202 with the reducing HRT utilizing second peristaltic pump 244. In an exemplary implementation, continuously feeding the nitrate-contaminated water into photobioreactor 202 with the reducing HRT may include continuously feeding the nitrate-contaminated water into photobioreactor 202 with a gradually reducing HRT from the constant HRT in a range between about 1 day and about 6 days to the minimum HRT in a range between about 1 hour and about 1 day.

Moreover, step 162 may include continuously injecting $CO_2$ to photobioreactor 202 with a flow rate between 70 mL/min and 200 mL/min. In an exemplary implementation, injecting $CO_2$ to photobioreactor 202 may allow for retaining pH value of the contents within photobioreactor 202 in a range between 6.5 and 7.5 as well as supplying a source of carbon that may be required for growing the plurality of microalgae-HTD granules.

In an exemplary implementation, mixing the fed nitrate-contaminated water and the plurality of microalgae-HTD granules by circulating a part of contents within photobioreactor 202 using first peristaltic pump 242 (step 164) may be done while keeping temperature of contents within photobioreactor 202 at a range between about 23° C. and about 33° C. and applying the light-dark cycle to the contents within photobioreactor 202. In an exemplary implementation, keeping temperature of contents within photobioreactor 202 at the range between about 23° C. and about 33° C. may be carried out by circulating a liquid through outer cylindrical layer 220 around photobioreactor 202.

In an exemplary implementation, applying the light-dark cycle to the contents within photobioreactor 202 may include lighting the contents within photobioreactor 202 for a time period between about 13 hours and about 19 hours with a light intensity inside photobioreactor 202 in a range between about 200 $\mu mol/m^2/s$ and about 400 $\mu mol/m^2/s$ using set of LEDs 210 located around photobioreactor 202, and turning off set of LEDs 210 for a time period between about 5 hours and about 11 hours. In an exemplary implementation, lighting the contents within photobioreactor 202, and turning off set of LEDs 210 may be carried out sequentially after each other.

Moreover, step 166 may include driving out a plurality of low-settleable microalgae-HTD granules by continuously discharging an overflow of photobioreactor 202. In an exemplary implementation, driving out the plurality of low-settleable microalgae-HTD granules may further include retaining high-settleable microalgae-HTD granules within photobioreactor 202. In an exemplary implementation, the plurality of high-settleable microalgae-HTD granules may include a plurality of microalgae-HTD granules with a zeta potential equal to 1.3 to 4.5 times of a zeta potential of the low-settleable microalgae-HTD granules or more. In an exemplary implementation, high-settleable microalgae-HTD granules at the minimum HRT may include a plurality of microalgae-HTD granules with a zeta potential near to zero.

In an exemplary implementation, high-settleable microalgae-HTD granules may have a settling efficiency (SE) of about 1.5 to 3.3 times of their initial SE. In an exemplary implementation, the SE of a plurality of granules may be defined by the following equation:

$$\text{Settling efficiency } (SE) = 1 - \frac{OD_1}{OD_0}$$

Where, OD refers to an optical density (OD) of an outflow sample from a suspension of the plurality of granules, which may be measured at a wavelength of about 750 nm. In detail, $OD_0$ and $OD_1$ may be optical densities (OD) of a supernatant that may be taken at time zero and an arbitrary time (e.g. 30 minutes after granules formation), respectively.

In an exemplary implementation, method 100 may further include continuous nitrate removal from a continuous flow of nitrate-contaminated water with a minimum HRT over the grown plurality of microalgae-HTD granules inside photobioreactor 202 in the UF mode at the set of controlled operational conditions (step 112).

Figure 1H:
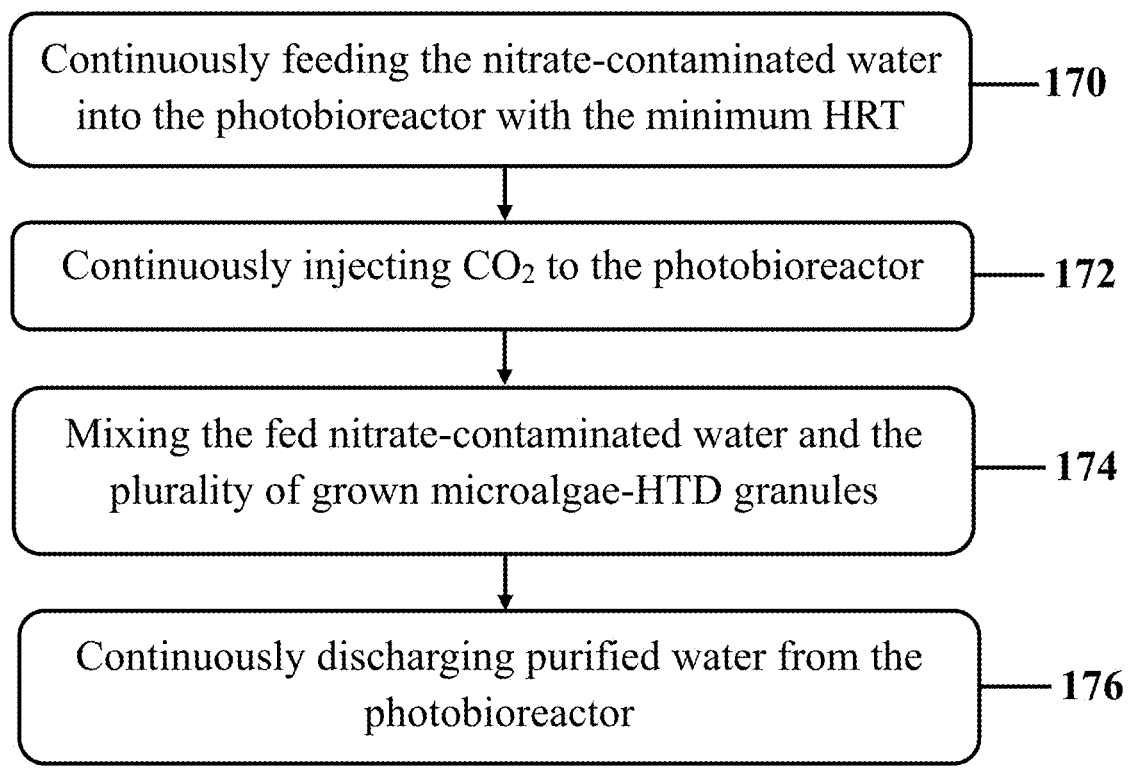
FIG. 1H shows an exemplary implementation of an exemplary process for continuousl nitrate removal from a continuous flow of nitrate-contaminated water with a minimum HRT over exemplary grown plurality of microalgae-HTD granules, consistent with one or more exemplary embodiments of the present disclosure.

FIG. 1H shows an exemplary implementation of an exemplary process for continuous nitrate removal from the continuous flow of nitrate-contaminated water with the minimum HRT over the grown plurality of microalgae-HTD granules (step 112), consistent with one or more exemplary embodiments of the present disclosure. Continuous nitrate removal from the continuous flow of nitrate-contaminated water with the minimum HRT over the grown plurality of microalgae-HTD granules (step 112) may include continuously feeding the nitrate-contaminated water into photobioreactor 202 with the minimum HRT using second peristaltic pump 244 (step 170), continuously injecting $CO_2$ to photobioreactor 202 with a flow rate between 70 mL/min and 200 mL/min (step 172), mixing the fed nitrate-contaminated water and the grown plurality of microalgae-HTD granules by circulating a part of contents within photobioreactor 202 using first peristaltic pump 242 (step 174), and continuously discharging purified water from photobioreactor 202 (step 176).

In an exemplary implementation, continuous nitrate removal from the continuous flow of nitrate-contaminated water with the minimum HRT over the grown plurality of microalgae-HTD granules (step 112) may include continuous nitrate removal from the continuous flow of nitrate-contaminated water with the minimum HRT over the remained high-settleable grown microalgae-HTD granules. In an exemplary implementation, continuous nitrate removal from the continuous flow of nitrate-contaminated water with the minimum HRT over the remained high-settleable grown microalgae-HTD granules may allow for a fast nitrate removal from drinking water in a few hours due to the minimum HRT, which may require high feeding and discharging flow rates. Moreover, continuous nitrate removal from the continuous flow of nitrate-contaminated water with the minimum HRT over the remained high-settleable grown microalgae-HTD granules may allow for obtaining purified water, which may be driven out from separator part 216 and collected in exemplary effluent tank 206, without any needs for applying a post-treatment to the purified water, since the remained high-settleable grown microalgae-HTD granules may not entered into the purified water due to their high density.

Example 1: Construction of Hybrid Photobioreactor

In this example, a photobioreactor (a hybrid photobioreactor) similar to exemplary photobioreactor 202 was constructed and a setup similar to exemplary setup 200 was assembled for nitrate removal from drinking water according to exemplary method 100 described hereinabove.

Figure 3:
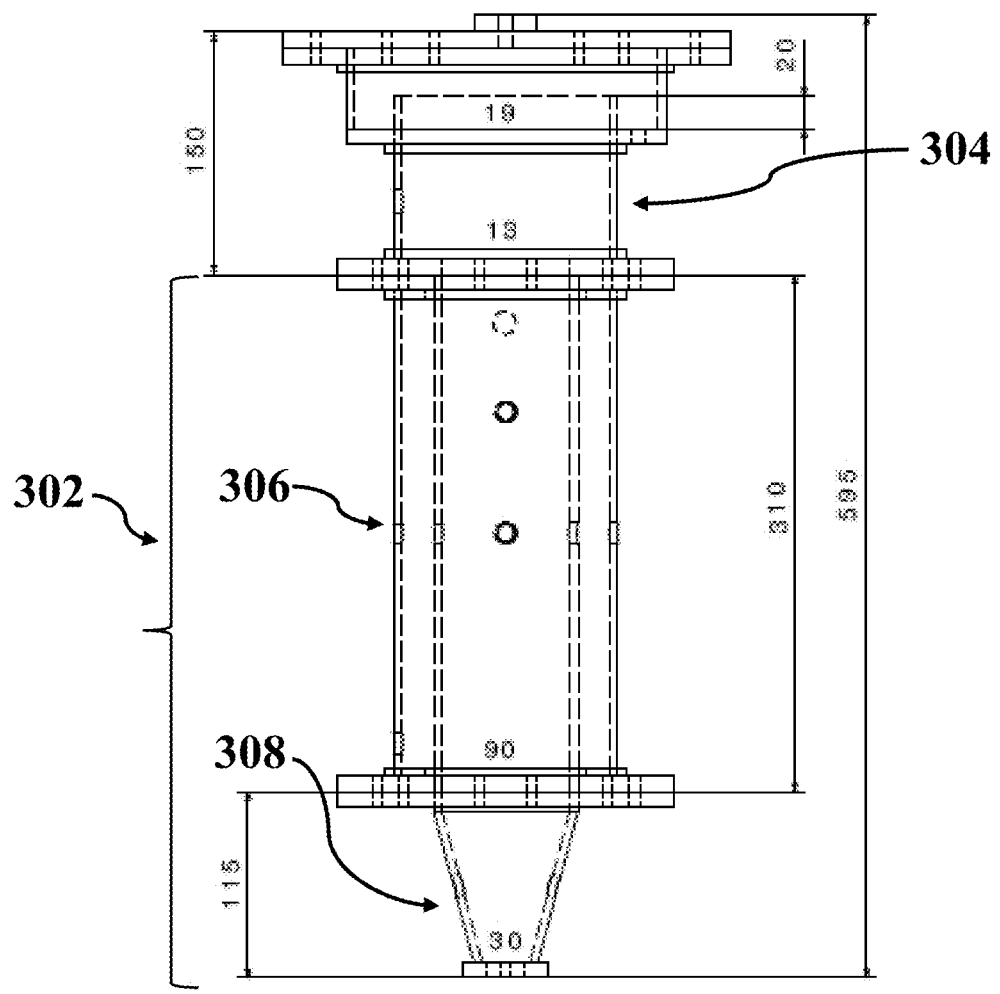
FIG. 3 illustrates a schematic front view of an exemplary constructed photobioreactor with designed diameters and heights (scales are in mm), consistent with one or more exemplary embodiments of the present disclosure.

FIG. 3 shows a schematic front view 300 of an exemplary constructed photobioreactor with designed diameters and heights (scales are in mm), consistent with one or more exemplary embodiments of the present disclosure. Exemplary constructed photobioreactor may include two cylindrical Plexiglas layers with two sections of active internal part 302 with volume of about 2 liters (a cylinder 306 with diameter of about 9 cm and height of about 31 cm and a cone 308 with a diameter of about 3 cm and height of about 11.5 cm), and separator part 304 with approximately volume of about 1.5 liter (a cylinder with about 13 cm in diameter and about 12 cm in height) which may be located in above of photobioreactor. The working volume of exemplary photobioreactor was about 3.5 liters, in which the outflow was discharged by an overflow placed in above the photobioreactor. The outer layer of the photobioreactor may act as a jacket in which a water bath may control the inside temperature in a range of about 25-28° C. by recirculating hot and cold water.

Eight LED strips similar to set of LEDs 210 were attached around the photobioreactor produced light intensity equal to about 250 µmol m$^{-2}$ s$^{-1}$ inside the photobioreactor. These eight LED strips included white LEDs that were connected to a power supply and supplied the required light source by adjusting an appropriate voltage. A Light-dark cycle (18:6 hour) was applied utilizing the eight LED strips in order to improve the nitrate removal efficiency and microalgae growth. Carbon dioxide ($CO_2$) entered from the bottom of the photobioreactor through a spherical sparger with pore diameter of about 1 mm. The ventilation path was embedded in above of the photobioreactor to remove undesirable gases and vapors. The pH value was detected by a sensor probe placed inside the photobioreactor and the relevant data was transferred to a data processor. The set value of pH in a range between 6.5 and 7.5 was controlled by automatic addition of $CO_2$ with flow rate of about 100 mL/min. A check valve was placed on the way connecting a $CO_2$ hose to the photobioreactor in order to prevent water from entering the gas chamber. All liquid and gas hoses were defined with an inner diameter of about 6 mm. Dissolved oxygen (DO) and temperature sensors were also attached to the photobioreactor and their data was transmitted to the data processor via a programmable logic controller (PLC). All analog data from the sensors were converted to digital data by the PLC containing all sensors' transmitters and eventually were transferred to the data processor and were saved.

A part of the photobioreactor content in the separator part 304 was recirculated into the bottom of the photobioreactor by a peristaltic pump at a flow rate of about 50 mL/min to increase the inside mixing. Another peristaltic pump was responsible of injecting the feed (water containing nitrate) into the photobioreactor with changing its flow rates from about 1 mL/min to about 43 mL/min for providing HRTs from about 3 days to less than about 2 hours. All details of set-up were similar to exemplary setup 200 as shown in FIG. 2.

Example 2: Preparation of Adapted Sludge Enriched by HTDs and Green Microalgae

In this example, exemplary adapted (screened) sludge and cultivated microalgae biomass were prepared. An activated sludge was collected from an anaerobic section of a local sewage treatment plant, and after about one week rinsing with tap water, the rinsed sludge was entered the adaptation stage with hydrogen and $CO_2$ gases, in which hydrogenotrophic denitrifiers (HTDs) could be dominant. For this, the activated sludge was cultivated with $CO_2$ and $H_2$ gases, and tap water containing $KNO_3$ and $KH_2PO_4$ in a cylindrical container for about one month. A mechanical stirrer was also rotated at a suitable speed of about 20 rpm in the container to make a good mixing and keep the dissolved oxygen concentration below about 2 mg/L. The amount of nitrate ($NO_3^-$) entering the container with $NO_3^-$—N/$PO_4^{3-}$—P mass ratio of about 10 was considered about 221 mg $NO_3$/L (50 mg $NO_3^-$—N/L). Hence, about 1803 mg of $KNO_3$ and about 113 mg of $KH_2PO_4$ were dissolved in a 1-liter beaker and then was transferred to the cylindrical container containing the sludge. After that, appropriate amount of tap water was added to the container to reach a final volume of about 5 liters. Volumetric flow rates of $CO_2$ and hydrogen gas were adjusted at about 10 mL/min and about 15 mL/min, respectively, to avoid sudden drop in pH and to make a good mixing in addition to stirring.

Every two days, the injection of gases and rotation of stirrer in container were stopped and the sludge was settled down for about 30 minutes. After that, the upper supernatant was discarded and a fresh feed was added to the container again. After three weeks, the color of activated sludge shifted from dark brown to light brown. The nitrate concentration in the container was reduced over time and after about four weeks, it reached less than the standard level of about 50 mg $NO_3^-$/L (about 10 mg $NO_3^-$—N/L). The results indicated that HTDs could overcome other microorganisms and remove nitrate completely at the presence of hydrogen and $CO_2$. To confirm this, injecting both hydrogen and $CO_2$ gases was stopped for about one day and then, feeding was started. After taking the samples, there was no reduction on nitrate-nitrogen concentration and it remained constant.

After three weeks from the starting of dominating stage of HTDs, inlet gases and mechanical stirrer were turned off. Then, about 30 min settling period was conducted and upper supernatant was discarded. Finally, about 50 mL of remained biomass (settled HTDs) with dried cell weight (DCW) of about 1.5 g/L was taken and transferred into the constructed photobioreactor (described in EXAMPLE 1 hereinabove) similar to exemplary photobioreactor 202, described hereinabove, along with the following pre-cultivated green microalgae, described herein below.

The DCW was obtained by weighing the microbial biomass after filtering and washing them two times with deionized water, followed by overnight drying in an oven at about 106° C. until achieving a constant weight. Glass microfiber filters with diameter of about 25 mm and pore size of about 0.25 µm were dried at about 106° C. and weighed before the filtration. For this, about 5 mL of samples were filtered and then dried in oven at about 106° C. for about 24 hours. The differences in the weight of the dried filter before and after the filtration process were reported as DCW. All measurements were repeated three times and average values were reported here.

For cultivation of microalgae biomass, three microalgae species of Ettlia sp., C. vulgaris, and C. reinhardtii were obtained and were utilized to make a mixture of them. First, each of three microalgae strains was cultivated separately in a 500-mL Erlenmeyer flask containing BG-11 medium and put in an incubator shaker with temperature of about 270° C. for about one week. Then, the same cell number of each cultivated microalgae strain was transferred to a vessel containing BG-11 to prepare a mix-culture of three stains.

In detail, to prepare BG-11 culture medium, distilled water, defined chemical components (based on microalgae growth Handbook), digital laboratory balance, sampler, and autoclave were provided. After making the BG-11 culture in the Erlenmeyer flask, it was autoclaved; and then, was cooled under sterile condition of laminar hood. Microalgae species were inoculated to prepared medium under sterile situation.

For each culture, the same cell number of each strain (about $10^6$ cells/mL) was injected into each Erlenmeyer flask containing BG-11 medium culture under completely sterile conditions in the laminar hood. The cell numbers were determined using a disposable plastic Neubauer hemocytometer. Only samples without overlapping cells on the grid were counted. To prepare the hemocytometer, about 10 µL of the cell suspension was put in a V-shaped well using an automatic pipette, and cell number was counted under microscope.

Light-emitting diode (LED) as the irradiance source produced continuous white light with intensity of about 250 µmol/m$^2$/s on surface of each Erlenmeyer flask. After a week of pre-culture, the same cell number of each microalgae strain (about $10^6$ cells/mL) was transferred to a 1-liter Erlenmeyer flask containing BG-11 under sterile condition, same as single culture, to prepare a mix-culture of three stains. After about one week, the mix-culture of microalgae was settled down for about 30 minutes and its supernatant was removed. Then, about 300 mL of remained microalgae biomass with DCW of about 0.25 was inoculated to the photobioreactor with the same total biomass equal to inoculated HTDs.

Example 3: Microalgae-HTD Granules Formation and Nitrate Removal from Nitrate-Contaminated Drinking Water Using Thereof Initially, about 3.15 L of water with its specifications given in the following, about 50 mg/L of $NO_3^-$—N and about 10 mg/L of $PO_4^{3-}$—P were added to the constructed photobioreactor in EXAMPLE 1 in a batch mode (without any feed and outflow). Specifications of applied water was as follow: about 50 mg/L of Calcium (Ca), about 12 mg/L of Magnesium (Mg), about 6.8 mg/L of Sodium (Na), about 0.6 mg/L of Potassium (K), about 14 mg/L of Sulfate ($SO_4^{2-}$), about 1.8 mg/L of Nitrate-Nitrogen ($NO_3^-$—N), about 18 mg/L of Chloride (Cl), about 210 mg/L of TDS, and pH of about 7.06.

After that, nitrogen ($N_2$) gas was injected for about 30 minutes to remove dissolved oxygen in the environment, and then about 350 mL of the mixture of pre-cultivated HTDs and microalgae (as describe in EXAMPLE 2) at a mass ratio of 1:1 was inoculated to the photobioreactor. The operational parameters of temperature, pH, light intensity, and complete mixing were controlled during batch cultivation. Nitrate-nitrogen and phosphate-phosphorus of the medium were measured by a standard method of American Public Health Association (APHA) in the batch mode. For this, the microorganism suspensions were passed through a filter (0.25-µm-pore-size nylon membrane) to remove the cells and any other organic particles, and the filtrates were then stored at about 4° C. until performing the elemental analysis. The $NO_3^-$—N and $PO_4^{3-}$—P were determined by ultraviolet spectrophotometric screening and ascorbic acid methods, respectively. A UV spectrophotometer was used for the elemental analysis at wavelengths of 220 and 275 nm for $NO_3^-$—N and 880 nm for $PO_4^{3-}$—P.

When nitrogen-nitrate ($NO_3^-$—N) was completely eliminated after about 2 days, $CO_2$ injection was stopped and the lighting system was turned off automatically. Then, the HTDs-microalgae mixture was given a 30-minute settling time. After that, during about 5 minutes, the available supernatant on the top of settled microbial biomass with a lot of residual suspended particles was driven out of the photobioreactor by a solenoid valve placed in the middle of the photobioreactor until draining half volume of the photobioreactor. This strategy was utilized similar to SBR processes, and considered as a screening step for assisting the high-settleable and strong microbial biomass to stay more and remove low-settleable and floating particles from the photobioreactor. After about 5 minutes and removal of low-settleable particles, the solenoid valve was closed and the system was entered in a continuous mode in which water containing about 50 of N—$NO^{3-}$ and about 10 mg/L of $PO_4^{3-}$—P was fed into the photobioreactor by a peristaltic pump at a flow rate of about 1.2 mL/min to provide HRT equal to about 3 days.

In the first week of the continuous process similar to SBR, every three days and after the last gas injection, the particles were allowed to settle for about 30 minutes; and then, the solenoid valve was opened automatically for about 5 minutes to drain the supernatant from the photobioreactor. After draining half of the photobioreactor content, the solenoid valve was closed and the fresh feed entered the photobioreactor again. During the three-day cycle, HTDs-microalgae mixture had the opportunity to produce more extracellular polymeric materials to change their surface charge and increase their zeta potential.

Figure 4:
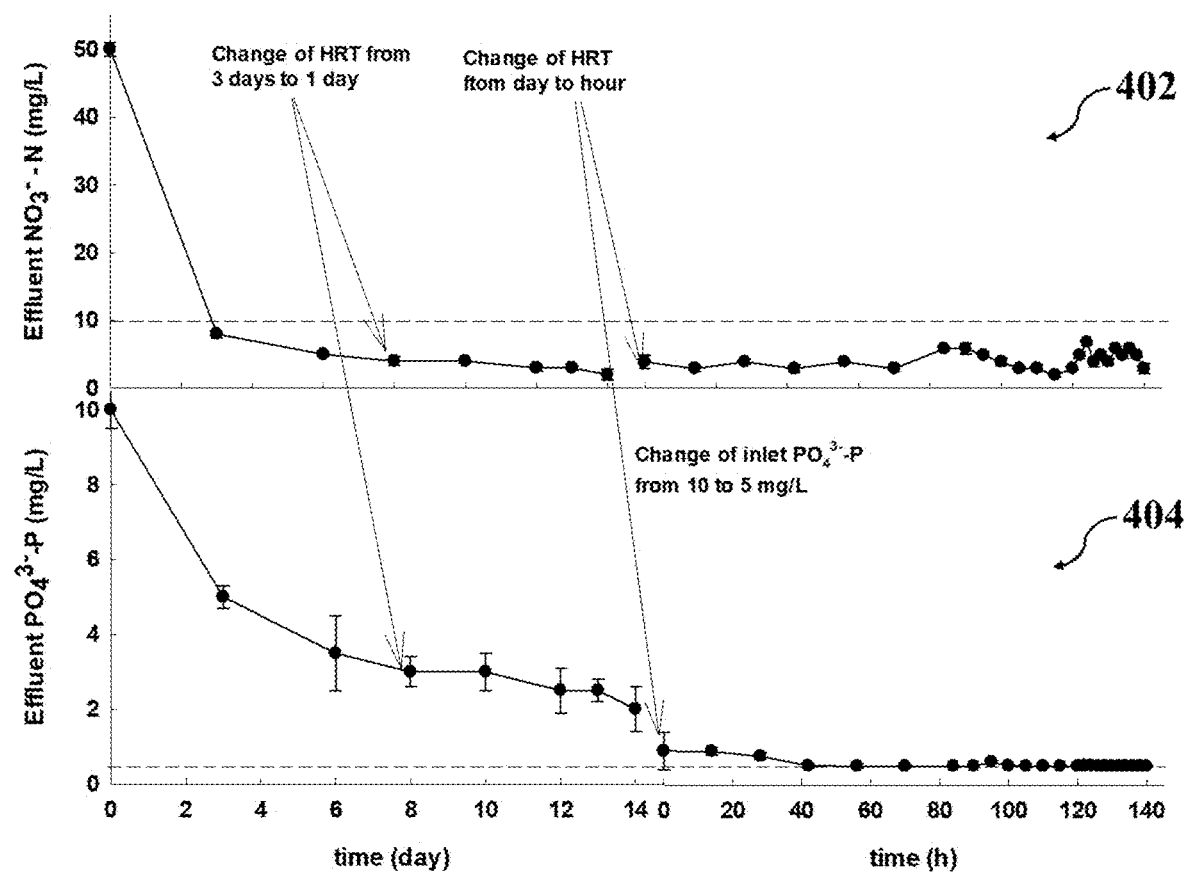
FIG. 4 illustrates variations of $NO_3^-$—N and $PO_4^{3-}$—P in outflow of the exemplary photobioreactor, consistent with one or more exemplary embodiments of the present disclosure.

FIG. 4 shows variations of $NO_3^-$—N (diagram 402) and $PO_4^{3-}$—P (diagram 404) in outflow of the photobioreactor, consistent with one or more exemplary embodiments of the present disclosure. It may be observed that during the first week of continuous operation, the level of nitrate-nitrogen was less than about 4 mg/L in the outflow which was lower than the standard level of 10 mg $NO_3^-$—N/L. The amount of phosphate-phosphorus in the outflow was more than the standard value of 0.5 mg/L, however it decreased over time. These standard levels were defined by two organizations of the World Health Organization (WHO) and United States Environmental Protection Agency (US EPA).

In order to evaluate the reduction of suspended particles in the outflow, two samples were taken from the treated water in the output of the photobioreactor and their optical density at wavelength of 750 ($OD_{750}$) were read by an UV-spectrophotometer. The zeta potential of settled HTDs-microalgae inside the photobioreactor was also measured to evaluate the attachment trend of microbial biomass. For measuring zeta potential, a 15-mL suspension of the microbial biomass was selected from the settled-down HTDs-microalgae aggregation in the cone place of photobioreactor. The zeta potential of the samples were measured in folded capillary cells using a Zeta-sizer device.

Figure 5:
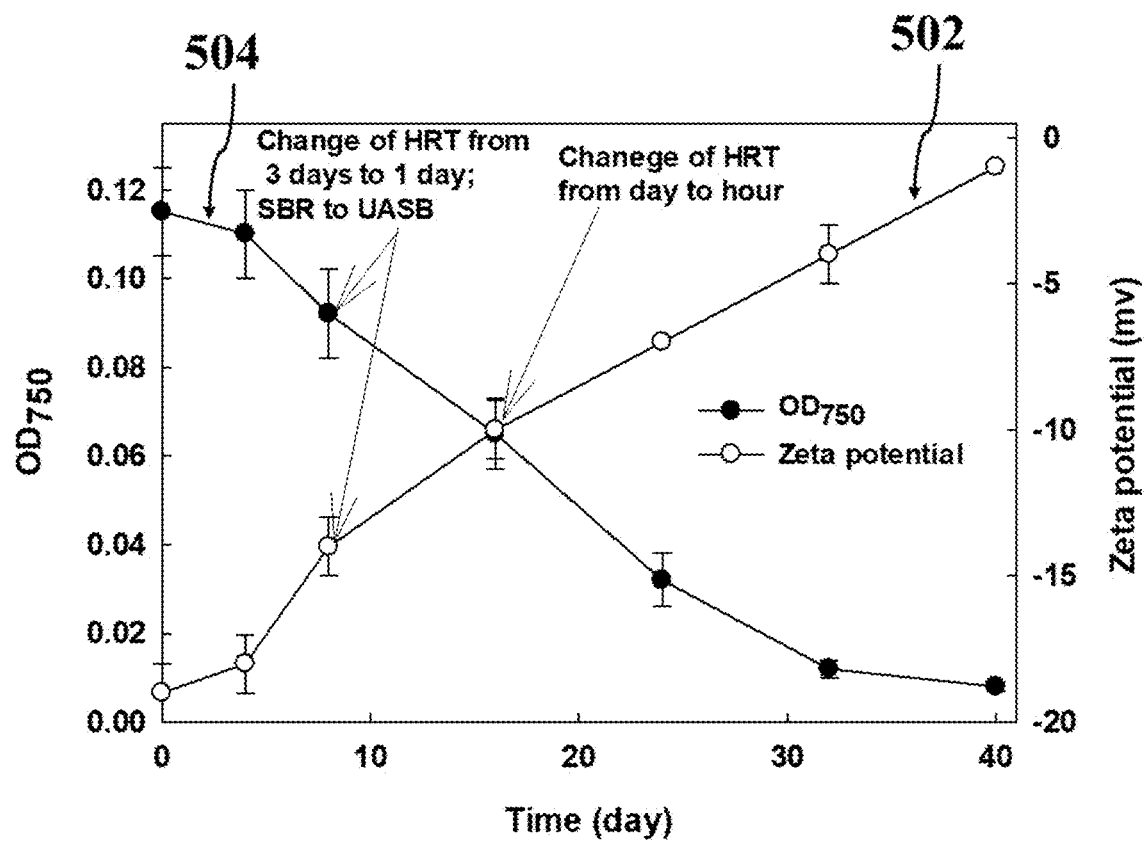
FIG. 5 illustrates variations of zeta potential for settled HTDs-microalgae along with reduction of optical density ($OD_{750}$) in the outflow of the exemplary photobioreactor, consistent with one or more exemplary embodiments of the present disclosure.

FIG. 5 shows variations of zeta potential (diagram 502) for settled HTDs-microalgae along with reduction of optical density ($OD_{750}$) (diagram 504) in the outflow of the photobioreactor, consistent with one or more exemplary embodiments of the present disclosure. When a sudden decrease in $OD_{750}$ and a sudden increase in zeta potential was observed at day 8, the nucleation of HTDs-microalgae granules was occurred in the photobioreactor. Hence, the step of screening high-settleable particles utilizing a 30-minute settling procedure was stopped.

After day 8, continuous up flow (UF) strategy with continuous up-flow feeding and reducing HRT from about 3 days to about one day was followed to accelerate the formation of HTDs-microalgae granular cores and to increase the removal rate of low-settleable particles. Hence, the inlet flow rate was increased up to about 3.5 mL/min to remove weak suspended particles under applied conditions via enhancing the up-flow velocity. This situation also helped the high-settleable and tension-resistant microbial biomass for high and rapid removal of pollutants through increasing the up-flow velocity.

When a magnitude of zeta potential reached almost half of initial value after about two weeks with approximately value of −10 mV, HRT decreased from one day to 14 hours and after passing 6 cycles, it reduced to about 7 hours in the photobioreactor which herein worked as up-flow photobioreactor.

With starting the hour-scaled HRT duration, the amount of $PO_4^{3-}$—P in the feed was reduced from about 10 mg/L to about 5 mg/L in the inlet feed of the photobioreactor and sustained until the end of the process (FIG. 4) due to an appearance of initial granular HTDs-microalgae cores and increasing phosphorus-phosphate removal rate as well as other contaminants like COD. After 10 cycles, HRT decreased from about 7 hours to about 2 hours with feed flow rate of about 43 mL/min, in which the zeta potential reached near zero at about −1 mV. During the treatment process with HRTs less than one day, both concentration of nitrogen-nitrate and phosphor-phosphate in the outflow were below the standard values and a complete clear stream was observed at the outflow (FIG. 4). By increasing the zeta potential and approaching it to zero, the cores of HTDs-microalgae granules reached more persistence and sustainability; thereby, they could settle down easily by neutralization of their surface charge. The higher zeta potential could lead to lower effluent turbidity resulted from higher settleability of particles, which produced a clear and non-turbid outflow of treated water without any suspended particles.

Figure 6:
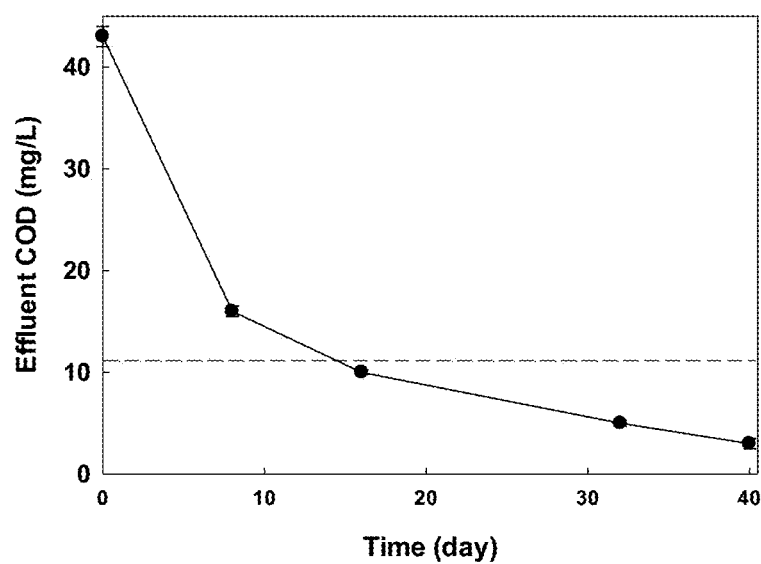
FIG. 6 illustrates variations of chemical oxygen demand (COD) released from HTDs and microalgae in the outflow of the exemplary photobioreactor, consistent with one or more exemplary embodiments of the present disclosure.

FIG. 6 shows variations of chemical oxygen demand (COD) released from HTDs and microalgae in the outflow of the photobioreactor, consistent with one or more exemplary embodiments of the present disclosure. The level of organic carbon released into environment, due to the HTD-microalgae cells growth and lysis, was analyzed based on the COD parameter. The COD values in the outflow decreased over the time and reached below the standard level of 10 mg/L based on WHO. COD was measured by low range kit (10-150 mg COD/L), which were made according to the standard method of dichromaxidation (based on APHA). For measuring the COD value, about 2 mL of sample from effluent flow was added to a kit and then put in a digester reactor with a constant temperature of 150° C. for about 2 hours. After that, the sample was taken from the reactor and be cooled at room temperature, and then were read at 600 nm in the spectrophotometer.

A 30-min settling efficiency (SE) for each microalgae and HTDs in pre-culture and before inoculation were about 0.35 and 0.7, respectively. While the settling efficiency of HTDs-microalgae mixture was about 0.55 after inoculation to the photobioreactor, and it reached 0.65 at the end of batch culture. During the continuous phase, the settling efficiency was increased by decreasing effluent $OD_{750}$ and increasing zeta potential of the inside HTDs-microalgae mixture. At the end of the continuous phase (day 40), the settling efficiency reached 0.98 when the zeta potential approached zero.

In order to determine the settling efficiency (SE) of microorganism during the 30-min settling period and also in order to separate the microbial biomass from treated water easily, the optical density (OD) of the outflow samples was measured at wavelength of 750 nm using following equation:

$$\text{Settling efficiency } (SE) = 1 - \frac{OD_1}{OD_0}$$

Where, $OD_0$ and $OD_1$ are the optical density (OD) of the supernatants that were taken at time zero and 30 min, respectively.

All observations indicated a high tendency of HTDs and microalgae for more connection to each other, higher settling, and the formation of HTDs-microalgae granules and their growth.

Figure 7:
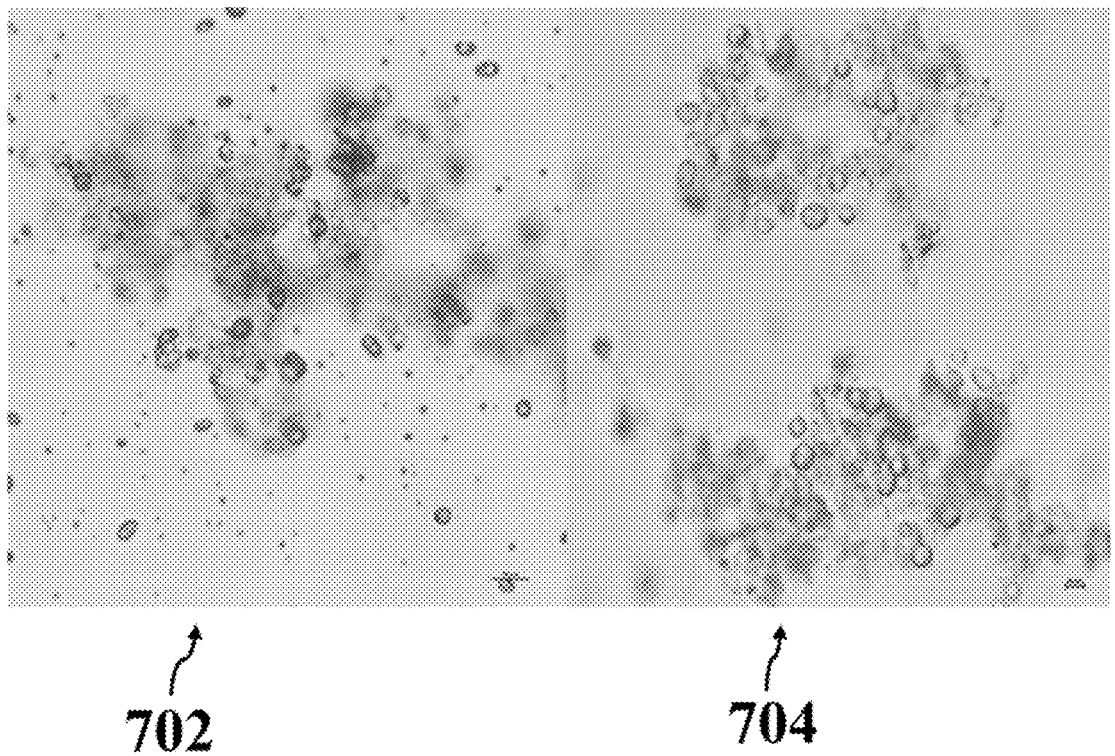
FIG. 7 illustrates two microscopic images of initial connection of activated sludge enriched by HTDs (integrated dark area in the centers) and microalgae (spherical shapes)

According to the microscopic observations during the process, there were some initial aggregation of microalgae and HTDs (sludge) in the first week which was indicative of inserting HTDs (sludge) on the center of these flocks with dispression of microalgae in around of them. FIG. 7 shows two microscopic images 702 and 704 of initial connection of activated sludge enriched by HTDs (integrated dark area in the centers) and microalgae (spherical shapes) at 400× magnification (first week of continuous process), consistent with one or more exemplary embodiments of the present disclosure. Furthermore, FIG. 8 shows two microscopic images 802 and 804 of fine-granular cores of HTDs (integrated dark area in the centers) and microalgae (bright spots with spherical shapes around the core) at 100× magnification (three weeks of continuous process), consistent with one or more exemplary embodiments of the present disclosure. Because microalgae needed light for their growth and activity, while HTD wanted to prepare an appropriate situation for the activity in places away from oxygen. After two weeks, fine cores of HTD-microalgae were appeared with high capability of converting to mature granules over the time. Hence, the microalgae attachment to sludge enriched by HTD could led to the formation of bigger and stronger flocks which can be converted to a stable granular structure. In order to obtain microscopic images, two microscopes were used. A sample of settled HTD-microalgae granule was placed on the microscopic slide and then, was photographed at 100 to 400 times magnification.

FIG. 9A shows a scanning electron microscope (SEM) image of the connection of HTDs and microalgae by the produced gel-layer after about two weeks, consistent with one or more exemplary embodiments of the present disclosure. FIG. 9B shows a SEM image representing the exemplary gel-layer covered completely on a surface of microalgae at the end of process, consistent with one or more exemplary embodiments of the present disclosure. For SEM imaging, samples were taken from the settled HTDs-microalgae granule and filtrated by glass microfiber filters (diameter 150 mm, pore size 0.2 µm). The SEM images were taken after drying the filtrated samples at room temperature under sterile conditions. For this, the samples were coated by a nano-layer of gold and used for SEM photography. SEM images showed that all surfaces of microalgae were covered by a sticky and gel-layer of extracellular polymeric substances resulted from HTDs and microalgae which lead to higher attachment of microalgae and HTDs and formation of HTDs-microalgae granules within changing their surface charges with reducing HRT. Since HTDs are some bacteria with smaller sizes than microalgae, they were trapped inside gel layer. Secretion of the extra polymeric substances from microbial activity and cell lysis forced microalgae and HTDs to connect better to each other and form initial cores of granules.

In order to evaluate the settling velocity of HTDs-microalgae attachment in the photobioreactor, about 10 mL of settled microbial biomass from the cone place was taken on day 21 and after shaking, it was given time to be settled down again. It was observed that the integrated particles could move down the graduated cylinder with velocity of about 5.5 m/h and produce the settling efficiency of 0.8, which in comparison with single system of each microalgae and activated sludge was high. However, the settling velocity of formed granules in the real photobioreactor could reach about 40 m/h with settling efficacy of 0.98 at the end of day 40 for producing a clear treated water.

With increasing the settling capability of microbial biomass, the formed granules were completely settled down in the cone place of the photobioreactor and just moved up by injection of $CO_2$ gas, which rapidly were settled down again. Hence, the formed granules could separate easily and rapidly from treated water gas during 15 minutes after each injection of $CO_2$ at the end of process. This could approve the formation of initial granular cores of HTD-microalgae with sizes about 1-3 mm which could grow more in linger operation time and add to their thicknesses.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for nitrate removal from drinking water, comprising:
    adapting a sludge comprising hydrogenotrophic denitrifiers (HTDs) by dominating the HTDs among a plurality of microorganisms present in the sludge;
    cultivating a microalgae biomass;
    forming a microalgae-HTD biomass by cultivating a mixture of the adapted sludge and the cultivated microalgae biomass in nitrate-contaminated water inside a photobioreactor in a batch mode at a set of controlled operational conditions, forming the microalgae-HTD biomass comprising reducing nitrate-nitrogen ($NO_3^-$—N) concentration of the nitrate-contaminated water to less than 5 mg/L;
    nucleating a plurality of microalgae-HTD granules by cultivating the microalgae-HTD biomass in the nitrate-contaminated water inside the photobioreactor in a sequencing batch (SB) mode with a constant hydraulic retention time (HRT), nucleating the plurality of microalgae-HTD granules comprising reducing nitrate-nitrogen ($NO_3^-$—N) concentration of the nitrate-contaminated water to less than 5 mg/L; and
    growing the plurality of microalgae-HTD granules by cultivating the nucleated plurality of microalgae-HTD granules in the nitrate-contaminated water inside the photobioreactor in an up flow (UF) mode with a reducing HRT at the set of controlled operational conditions, growing the plurality of microalgae-HTD granules comprising reducing nitrate-nitrogen ($NO_3^-$—N) concentration of the nitrate-contaminated water to less than 5 mg/L.

2. The method of claim 1, wherein the sludge comprises an activated sludge collected from anaerobic section of a sewage treatment plant.

3. The method of claim 1, wherein:
    the nitrate-contaminated water comprises a nitrate ($NO_3^-$) concentration in a range between 100 mg/L and 350 mg/L, and
    the nitrate-contaminated water comprises at least one of nitrate-contaminated drinking water, pristine mountain water, tap water, ground water, synthetic nitrate-contaminated water, and combinations thereof.

4. The method of claim 3, wherein the nitrate-contaminated water comprises tap water comprising:
    at least one salt of $KNO_3$, $NaNO_3$, and combinations thereof with a $NO_3^-$—N concentration between 20 mg/L and 80 mg/L; and
    at least one salt of $KH_2PO_4$, $NaH_2PO_4$, and combinations thereof with a $PO_4^{3-}$—P concentration between 3 mg/L and 13 mg/L.

5. The method of claim 1, wherein adapting the sludge comprises feeding the HTDs in the sludge with a mixture of carbon dioxide ($CO_2$), hydrogen gas ($H_2$), and the nitrate-contaminated water, adapting the sludge further comprising reducing nitrate-nitrogen ($NO_3^-$—N) concentration of the nitrate-contaminated water to less than 5 mg/L.

6. The method of claim 1, wherein adapting the sludge comprises:
    rinsing the sludge by water;
    placing the rinsed sludge in a container;
    forming the adapted sludge, comprising:
        injecting $CO_2$ gas into the container with a flow rate in a range between 5 mL/min and 25 mL/min;
        injecting $H_2$ gas into the container with a flow rate in a range between 10 mL/min and 30 mL/min; and
        injecting the nitrate-contaminated water into the container, the nitrate-contaminated water comprising a nitrate concentration in a range between 100 mg/L and 350 mg/L;
    settling down the adapted sludge in the container; and
    discharging a supernatant above the settled down adapted sludge,
    wherein forming the adapted sludge, settling down the adapted sludge, and discharging the supernatant are done iteratively in 2-day cycles.

7. The method of claim 6, wherein forming the adapted sludge further comprises stirring the rinsed sludge, the injected $CO_2$ gas, the injected $H_2$ gas, and the injected nitrate-contaminated water in the container by rotating a mechanical stirrer in the container at a rotating speed in a range between 15 rpm and 40 rpm.

8. The method of claim 1, wherein cultivating the microalgae biomass comprises cultivating a microalgae strain comprising at least one of an *Ettlia* sp. strain, a *C. vulgaris* strain, a *C. reinhardtii* strain, and combinations thereof.

9. The method of claim 8, wherein cultivating the microalgae biomass comprises:
    placing the microalgae strain and a BG11 medium (Blue-Green Medium) in a vessel;
    forming a cultured microalgae biomass, comprising:
        incubating the microalgae strain and the BG11 medium within the vessel at a temperature in a range between 23° C. and 33° C.;
        mixing the microalgae and the BG11 medium within the vessel at a mixing speed between 120 rpm and 220 rpm; and
        lighting the microalgae and the BG11 medium within the vessel with a light intensity in a range between 200 μmol/m$^2$/s and 400 μmol/m$^2$/s,
        wherein incubating the microalgae strain and the BG11 medium, mixing the microalgae and the BG11 medium, and lighting the microalgae and the BG11 medium are carried out concurrently for a time interval in a range between 4 days and 14 days; and
    settling down the cultured microalgae biomass.

10. The method of claim 9, wherein cultivating the microalgae biomass comprises cultivating a mixture of two or more microalgae strains with equal cell numbers of the two or more microalgae strains.

11. The method of claim 10, wherein cultivating the microalgae biomass further comprises:
    transferring a mixture of two or more pre-cultivated microalgae biomass to a container containing BG11 medium, the mixture of the two or more pre-cultivated microalgae biomass comprising an equal amount of each of the settled down cultured microalgae biomass associated with each of the two or more microalgae strains;
    forming a mix-cultured microalgae biomass, comprising:
        incubating the mixture of the pre-cultivated microalgae and the BG11 medium in the container at a temperature in a range between 23° C. and 33° C.;
        mixing the mixture of the pre-cultivated microalgae and the BG11 medium in the container at a mixing speed between 120 rpm and 220 rpm; and
        lighting the mixture of the pre-cultivated microalgae and the BG11 medium in the container with a light intensity in a range between 200 μmol/m$^2$/s and 400 μmol/m$^2$/s,
        wherein incubating the mixture of the pre-cultivated microalgae and the BG11 medium, mixing the mixture of the pre-cultivated microalgae and the BG11 medium, and lighting the mixture of the pre-cultivated microalgae and the BG11 medium are carried out concurrently for a time interval in a range between 4 days and 14 days; and settling down the mix-cultured microalgae biomass.

12. The method of claim 1, wherein the set of controlled operational conditions comprises:
    keeping temperature of contents within the photobioreactor at a range between 23° C. and 33° C. by circulating a liquid through an outer layer around the photobioreactor;
    keeping pH value of the contents within the photobioreactor in a range between 6.5 and 7.5 by controlling injection of $CO_2$ to the photobioreactor; and
    applying a light-dark cycle to the contents within the photobioreactor, comprising:
        lighting the contents within the photobioreactor for a time period between 13 hours and 19 hours with a light intensity in a range between 200 $\mu mol/m^2/s$ and 400 $\mu mol/m^2/s$ using a set of light-emitting diodes (LEDs) located around the photobioreactor; and
        turning off the set of LEDs for a time period between 5 hours and 11 hours,
        wherein lighting the contents within the photobioreactor, and turning off the set of LEDs are carried out sequentially.

13. The method of claim 1, wherein forming the microalgae-HTD biomass comprises:
    preparing a microalgae-HTD biomass producing medium, comprising:
        feeding the nitrate-contaminated water to the photobioreactor with an amount equal to a working volume of the photobioreactor;
        adding the mixture of the adapted sludge and the cultivated microalgae biomass with a mass ratio between 0.5 and 1.5 to the fed nitrate-contaminated water to the photobioreactor; and
        injecting $CO_2$ to the photobioreactor with a flow rate between 70 mL/min and 200 mL/min;
    forming the microalgae-HTD biomass by mixing the microalgae-HTD biomass producing medium comprising circulating a part of the microalgae-HTD biomass producing medium using a first peristaltic pump;
    measuring an amount of nitrogen-nitrate ($NO_3^-$—N) of the microalgae-HTD biomass producing medium;
    settling down the microalgae-HTD biomass responsive to the measured amount of nitrogen-nitrate ($NO_3^-$—N) being less than 5 mg/L; and
    discharging a supernatant above the settled down microalgae-HTD biomass from the photobioreactor.

14. The method of claim 13, wherein nucleating the plurality of microalgae-HTD granules comprises:
    applying a feeding phase;
    applying a reaction phase at the set of controlled operational conditions; and
    applying a screening phase,
    wherein applying the feeding phase, applying the reaction phase, and applying the screening phase are carried out sequentially in a cycle with the constant HRT between 1 day and 6 days.

15. The method of claim 14, wherein:
    applying the feeding phase comprises feeding the nitrate-contaminated water into the photobioreactor using a second peristaltic pump,
    applying the reaction phase at the set of controlled operational conditions comprises:
        turning the second peristaltic pump off;
        keeping pH value of the contents within the photobioreactor in a range between 6.5 and 7.5 by injecting $CO_2$ to the photobioreactor with a flow rate between 70 mL/min and 200 mL/min;
        mixing the fed nitrate-contaminated water and the formed microalgae-HTD biomass by circulating a part of contents within the photobioreactor using the first peristaltic pump;
        keeping temperature of contents within the photobioreactor at a range between 23° C. and 33° C. by circulating a liquid through an outer layer around the photobioreactor; and
        applying a light-dark cycle to the contents within the photobioreactor, comprising:
            lighting the contents within the photobioreactor for a time period between 13 hours and 19 hours with a light intensity in a range between 200 $\mu mol/m^2/s$ and 400 $\mu mol/m^2/s$ using a set of light-emitting diodes (LEDs) located around the photobioreactor; and
            turning off the set of LEDs for a time period between 5 hours and 11 hours,
        wherein lighting the contents within the photobioreactor, and turning off the set of LEDs are carried out sequentially, and
    applying the screening phase comprises:
        settling down the mixed nitrate-contaminated water and microalgae-HTD biomass for a time duration between 10 minutes and 1 hour; and
        discharging a supernatant above the settled down mixed nitrate-contaminated water and microalgae-HTD biomass, the discharged supernatant being equal to half of volume of contents within the photobioreactor.

16. The method of claim 15, wherein growing the plurality of microalgae-HTD granules comprises:
    continuously feeding the nitrate-contaminated water into the photobioreactor with a reducing HRT from the constant HRT to a minimum HRT using the second peristaltic pump;
    continuously injecting $CO_2$ to the photobioreactor with a flow rate between 70 mL/min and 200 mL/min;
    mixing the fed nitrate-contaminated water and the plurality of microalgae-HTD granules by circulating a part of contents within the photobioreactor using the first peristaltic pump; and
    driving out a plurality of low-settleable microalgae-HTD granules by continuously discharging an overflow of the photobioreactor, the overflow comprising the plurality of low-settleable microalgae-HTD granules.

17. The method of claim 16, wherein:
    driving out the plurality of low-settleable microalgae-HTD granules further comprises remaining high-settleable microalgae-HTD granules within the photobioreactor, and
    the plurality of high-settleable microalgae-HTD granules comprises a plurality of microalgae-HTD granules with a zeta potential value of 1.3 to 4.5 times of a zeta potential value of the low-settleable microalgae-HTD granules or more.

18. The method of claim 16, wherein continuously feeding the nitrate-contaminated water into the photobioreactor with the reducing HRT comprises continuously feeding the nitrate-contaminated water into the photobioreactor with the reducing HRT from the constant HRT in a range between 1 day and 6 days to the minimum HRT in a range between 1 hour and 1 day.

19. The method of claim 16, further comprising continuous nitrate removal from a continuous flow of the nitrate-contaminated water with the minimum HRT over the grown plurality of microalgae-HTD granules inside the photobioreactor in the UF mode at the set of controlled operational conditions.

20. The method of claim 19, wherein continuous nitrate removal from the continuous flow of the nitrate-contaminated water with the minimum HRT over the grown plurality of microalgae-HTD granules comprises:
- continuously feeding the nitrate-contaminated water into the photobioreactor with the minimum HRT using the second peristaltic pump;
- continuously injecting $CO_2$ to the photobioreactor with a flow rate between 70 mL/min and 200 mL/min;
- mixing the fed nitrate-contaminated water and the grown plurality of microalgae-HTD granules by circulating a part of contents within the photobioreactor using the first peristaltic pump; and
- continuously discharging purified water from the photobioreactor.

* * * * *